US008898228B2

(12) United States Patent  
Myers et al.

(10) Patent No.: US 8,898,228 B2  
(45) Date of Patent: Nov. 25, 2014

(54) METHODS AND SYSTEMS FOR SCALABLE VIDEO CHUNKING

(71) Applicant: SeaWell Networks Inc., Mississauga, CA (US)

(72) Inventors: Robert Linwood Myers, Mississauga, CA (US); Scott Ernest Aitchison, Oakville, CA (US); Gregory Scott Murray, Toronto (CA)

(73) Assignee: SeaWell Networks Inc., Mississauga (CA)

(*) Notice: Subject to any disclaimer, the term of this patent is extended or adjusted under 35 U.S.C. 154(b) by 0 days.

(21) Appl. No.: 14/037,906

(22) Filed: Sep. 26, 2013

(65) Prior Publication Data

US 2014/0040499 A1     Feb. 6, 2014

Related U.S. Application Data

(62) Division of application No. 12/842,474, filed on Jul. 23, 2010, now Pat. No. 8,566,393.

(60) Provisional application No. 61/232,615, filed on Aug. 10, 2009.

(51) Int. Cl.  
*G06F 15/16*     (2006.01)

(52) U.S. Cl.  
USPC .......................................... 709/203; 709/231

(58) Field of Classification Search  
USPC ................................ 709/203, 219, 231, 246  
See application file for complete search history.

(56) References Cited

U.S. PATENT DOCUMENTS

| 5,920,865 | A | 7/1999 | Ariga |
| 5,978,843 | A | 11/1999 | Wu et al. |
| 6,240,243 | B1 | 5/2001 | Chen et al. |
| 6,279,040 | B1 | 8/2001 | Ma et al. |
| 6,529,996 | B1 | 3/2003 | Nguyen et al. |
| 7,028,096 | B1 * | 4/2006 | Lee ............................... 709/231 |
| 7,095,782 | B1 | 8/2006 | Cohen et al. |
| 7,143,170 | B2 | 11/2006 | Swildens et al. |
| 7,194,000 | B2 * | 3/2007 | Balachandran et al. . 370/395.42 |
| 7,359,985 | B2 | 4/2008 | Grove et al. |
| 7,369,610 | B2 | 5/2008 | Xu et al. |

(Continued)

FOREIGN PATENT DOCUMENTS

EP     1122654 A1     8/2001

OTHER PUBLICATIONS

ISO-IEC 14496-15:2004 Amd 2:2008, "Information Technology—Coding of audio-visual objects—Part 15: Advanced Video Coding (AVC) file format".

(Continued)

*Primary Examiner* — Sargon Nano  
(74) *Attorney, Agent, or Firm* — Stewart M. Wiener

(57) ABSTRACT

Methods and systems for creating and retrieving scalable media files using a chunking model. A plurality of network abstraction layer (NAL) units representing a scalable media presentation are grouped into a plurality of video chunks wherein each chunk represents only the NAL units of one layer and a specific time period. The plurality of video chunks are then stored in one or more scalable media files along with indexing information which provides information for retrieving the NAL units from each video chunk. In this manner, a client can request only the video chunks (and thus NAL units) that it needs or wants to achieve a specific bandwidth.

9 Claims, 13 Drawing Sheets

(56) References Cited

U.S. PATENT DOCUMENTS

| | | | |
|---|---|---|---|
| 7,376,716 B2 | 5/2008 | Dilley et al. | |
| 7,392,325 B2 | 6/2008 | Grove et al. | |
| 7,446,774 B1 | 11/2008 | MacInnis et al. | |
| 7,536,469 B2 | 5/2009 | Chou et al. | |
| 7,536,470 B2 | 5/2009 | Li et al. | |
| 7,543,073 B2 | 6/2009 | Chou et al. | |
| 7,734,730 B2* | 6/2010 | McCanne | 709/219 |
| 7,930,449 B2 | 4/2011 | Tinsman et al. | |
| 7,991,049 B2 | 8/2011 | MacInnis et al. | |
| 8,065,426 B2 | 11/2011 | Edelman et al. | |
| 8,156,246 B2 | 4/2012 | Short et al. | |
| 8,161,021 B2 | 4/2012 | Hirabayashi et al. | |
| 8,184,142 B2 | 5/2012 | Harel et al. | |
| 8,190,677 B2 | 5/2012 | Myers et al. | |
| 8,213,769 B2 | 7/2012 | Fu et al. | |
| 8,218,628 B2 | 7/2012 | Schwarz et al. | |
| 8,228,363 B2 | 7/2012 | Halavy | |
| 8,233,532 B2* | 7/2012 | Wiegand et al. | 375/240.02 |
| 8,256,246 B2* | 9/2012 | Hollenhorst et al. | 68/3 R |
| 8,291,104 B2* | 10/2012 | Visharam et al. | 709/231 |
| 8,301,696 B2 | 10/2012 | Myers et al. | |
| 8,566,393 B2 | 10/2013 | Myers | |
| 2002/0021761 A1* | 2/2002 | Zhang et al. | 375/240.27 |
| 2002/0140851 A1 | 10/2002 | Laksono | |
| 2003/0195977 A1 | 10/2003 | Liu et al. | |
| 2004/0202320 A1* | 10/2004 | Amini et al. | 380/36 |
| 2005/0031308 A1 | 2/2005 | Fu et al. | |
| 2005/0163224 A1* | 7/2005 | Shin et al. | 375/240.25 |
| 2006/0083308 A1 | 4/2006 | Schwarz et al. | |
| 2006/0083309 A1 | 4/2006 | Schwarz et al. | |
| 2006/0143678 A1 | 6/2006 | Chou et al. | |
| 2006/0165166 A1 | 7/2006 | Chou et al. | |
| 2006/0248216 A1* | 11/2006 | Park | 709/231 |
| 2007/0016594 A1* | 1/2007 | Visharam et al. | 707/100 |
| 2007/0022215 A1* | 1/2007 | Singer et al. | 709/246 |
| 2007/0036218 A1 | 2/2007 | Burazerovic | |
| 2007/0118618 A1 | 5/2007 | Kisel et al. | |
| 2007/0121723 A1 | 5/2007 | Mathew et al. | |
| 2007/0165524 A1 | 7/2007 | Mascolo | |
| 2007/0201549 A1 | 8/2007 | Hannuksela et al. | |
| 2007/0263087 A1 | 11/2007 | Hong et al. | |
| 2007/0268362 A1 | 11/2007 | West et al. | |
| 2007/0276954 A1 | 11/2007 | Chan et al. | |
| 2007/0291837 A1* | 12/2007 | Eleftheriadis | 375/240.02 |
| 2008/0037656 A1 | 2/2008 | Hannuksela | |
| 2008/0095230 A1 | 4/2008 | Hannuksela et al. | |
| 2008/0120424 A1* | 5/2008 | Deshpande | 709/230 |
| 2008/0130658 A1 | 6/2008 | Chakareski et al. | |
| 2008/0211901 A1 | 9/2008 | Civanlar et al. | |
| 2008/0239062 A1 | 10/2008 | Civanlar et al. | |
| 2008/0247460 A1 | 10/2008 | Kang et al. | |
| 2009/0013083 A9 | 1/2009 | Garcia-Luna-Aceves et al. | |
| 2009/0016434 A1 | 1/2009 | Amonou et al. | |
| 2009/0031021 A1* | 1/2009 | Bae et al. | 709/224 |
| 2009/0083434 A1* | 3/2009 | Wang et al. | 709/231 |
| 2009/0119594 A1 | 5/2009 | Hannuksela | |
| 2009/0178091 A1* | 7/2009 | Miyamoto et al. | 725/91 |
| 2009/0295988 A1 | 12/2009 | Kohno | |
| 2010/0020866 A1 | 1/2010 | Marpe et al. | |
| 2010/0049865 A1* | 2/2010 | Hannuksela et al. | 709/231 |
| 2010/0080285 A1 | 4/2010 | Lee et al. | |
| 2010/0111183 A1 | 5/2010 | Jeon et al. | |
| 2010/0125629 A1 | 5/2010 | Serenyi et al. | |
| 2010/0189182 A1 | 7/2010 | Hannuksela | |
| 2010/0228862 A1 | 9/2010 | Myers | |
| 2010/0228875 A1 | 9/2010 | Myers | |
| 2010/0228880 A1 | 9/2010 | Hunt et al. | |
| 2010/0266042 A1 | 10/2010 | Koo et al. | |
| 2010/0268836 A1 | 10/2010 | Jabri et al. | |
| 2010/0296000 A1 | 11/2010 | Henocq et al. | |
| 2010/0316136 A1 | 12/2010 | Jeon et al. | |
| 2010/0316360 A1 | 12/2010 | Jeon et al. | |
| 2010/0316361 A1 | 12/2010 | Jeon et al. | |
| 2010/0316362 A1 | 12/2010 | Jeon et al. | |
| 2011/0013538 A1 | 1/2011 | Henocq et al. | |
| 2011/0038421 A1 | 2/2011 | Schwarz et al. | |
| 2011/0064146 A1 | 3/2011 | Chen et al. | |
| 2011/0082945 A1 | 4/2011 | Myers et al. | |
| 2011/0087794 A1 | 4/2011 | Li et al. | |
| 2011/0096828 A1 | 4/2011 | Chen et al. | |
| 2011/0110436 A1* | 5/2011 | Schierl et al. | 375/240.26 |
| 2011/0129025 A1* | 6/2011 | Jaeckel et al. | 375/260 |
| 2011/0173345 A1 | 7/2011 | Knox et al. | |
| 2011/0296048 A1 | 12/2011 | Knox et al. | |
| 2012/0011267 A1 | 1/2012 | Ma et al. | |
| 2012/0023155 A1 | 1/2012 | Myers et al. | |
| 2012/0023352 A1 | 1/2012 | Cumming et al. | |
| 2012/0027083 A1 | 2/2012 | Narroschke et al. | |
| 2012/0042050 A1 | 2/2012 | Chen et al. | |
| 2012/0137016 A1* | 5/2012 | Hsu et al. | 709/231 |
| 2012/0254456 A1 | 10/2012 | Visharam et al. | |
| 2012/0321082 A1 | 12/2012 | Fu et al. | |

OTHER PUBLICATIONS

Heiko Schwarz et al., "Overview of the Scalable Video Coding Extension of the H.264/AVC Standard", In: IEEE Transactions on Circuits and Systems for Video Technology, Sep. 2007, vol. 17, No. 9, Berlin, Germany.

Jens-Rainer Ohm, "Scalable Video Coding", In: Shenzhen Workshop, RWTH Aachen University, Oct. 2007, Aachen, Germany.

ISO/IEC 14496-12: Third Edition Oct. 15, 2008, "Information technology—Coding of audio-visual objects—Part 12: ISO base media file format".

Alex Zambelli: "IIS Smooth Streaming Technical Overview", Mar. 31, 2009, XP55009366, Retrieved from the Internet: URL: http://img.prodek.It/documents/IIs.sub.--Smooth.sub.--Streaming.sub.--Tec- hnical.sub.--Overview; pdf [retrieved on Oct. 12, 2011] the whole document.

Microsoft Corporation: "IIS Smooth Streaming Transport Protocol", Internet Citation, Sep. 8, 2009, pp. 1-55, XP002617721, Retrieved from the Internet: URL: http://www.iis.net/community/files/media/smoothspecs/%5BMS-SMTH%5D.pdf [retrieved on Jan. 21, 2011] section 1.3, section 4.

Thomas Schierl et al. "Response to CfP on HTTP Streaming of MPEG Media—on Adaptive HTTP Streaming using SVC and MVC", 93. MPEG Meeting; Jul. 26, 2010-Jul. 30, 2010; Geneva; (Motion Picture Expert Group or ISO/IEC JTC1/SC29/WG11) No. M17851, Jul. 22, 2010.

Universal Mobile Telecommunications System (UMTS); Ltd; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F06921 Sophia-Antipolis; France, vol. 3GPP SA 4, No. V9.3.0 Jun. 1, 2010, XP014047290, section 12.1, section 12.6.2, p. 109, examples 15 and 16.

Anonymous: "Study of ISO/IEC 14496-10: 2009/DCOR 1", 90. MPEG Meeting; Oct. 26, 2009-Oct. 30, 2009; Xian; (Motion Picture Expert Group or ISO/IEC JTC1/SC29/WG11) No. N10898, Nov. 18, 2009 XP030017397.

Wenger M M Hannuksela T Stockhammer M Westerlund D Singer S: "RTP Payload Format for H.264 Video; rfc3984. txt", 5. JCT-VC Meeting; 96. MPEG Meeting; Mar. 16, 2011-Mar. 23, 2011; Geneva; (Joint Collaborative Team on Video Coding of ISO/IEC JTC1/SC29NVG11AND ITU-T SG. 16); URL: http://wftp3.itu.int/av-arch/jc tvc-site/, Internet Engineering Task Force, IETF, CH, Feb. 1, 2005, XP015009755, ISSN: 0000-0003, section 5.5.

Hypertext Transfer Protocol—HTTP/1.1, Internet RFC 2616, Retrieved from the internet: URL: <http://www.w3.org/Protocols/rfc2616/rfc2616.html> [retrieved on Apr. 1, 2012].

"Use Standard Redirects—Don't Break the Back Button!", W3C, Retrieved from the Internet: URL: <http://www.w3.org/QA/Tips/reback> [retrieved on Apr. 1, 2012].

Documents relating to U.S. Appl. No. 12/842,474, now issued (Prosecution History), Jun. 21, 2013.

Documents relating to U.S. Appl. No. 12/842,515, now issued (Prosecution History), Mar. 5, 2012.

Document relating to US Appl. No. 12/400,306, dated Sep. 19, 2013 (Office Action Response).

(56) References Cited

OTHER PUBLICATIONS

Document relating to US Appl. No. 12/400,270, dated Jun. 17, 2013 (Office Action).
Document relating to US Appl. No. 12/400,270, dated Sep. 17, 2013 (Office Action Response).
Documents relating to U.S. Appl. No. 13/445,285, now issued (Prosecution History), Aug. 7, 2012.
Document relating to US Appl. No. 13/445,361, dated Dec. 6, 2013 (Office Action).
Document relating to U.S. Appl. No. 12/400,306, dated Dec. 27, 2013 (Office Action).
Document relating to U.S. Appl. No. 12/400,270, dated Dec. 17, 2013 (Office Action).
Document relating to U.S. Appl. No. 13/445,361, dated Jun. 6, 2014 (Office Action Response).

* cited by examiner

METHODS AND SYSTEMS FOR SCALABLE VIDEO CHUNKING

CROSS-REFERENCE TO RELATED APPLICATIONS

This application is a divisional of U.S. patent application Ser. No. 12/842,474, filed Jul. 23, 2010, which claims the benefit of U.S. Provisional Application No. 61/232,615 filed, Aug. 10, 2009. The entire content of U.S. patent application Ser. No. 12/842,474 is hereby incorporated by reference.

FIELD

The described embodiments relate to the field of streaming media, and in particular to streaming of scalable media, such as video and audio.

BACKGROUND

Video chunking can be described as the process of splitting up a video into a number of chunks or smaller videos, where each chunk represents a specific non-overlapping time block of the video. For example, each chunk may represent five seconds of the video. When a client wants to receive the video it requests the chunks using a standard protocol, such as HTTP (Hypertext Transfer Protocol). The client requests the chunks in the proper order and feeds the data to a decoder to provide a smooth flowing video.

Video chunking has recently been used to implement adaptive streaming of video. Specifically, several versions of a video are created, each representing a different video quality (and thus bandwidth). Each of these files is then split up into a number of chunks or smaller videos. This allows the client to select which chunk to download based on the current available bandwidth and/or the depth of the buffer. For example, the client may select a chunk from the lowest quality version of the video when there is limited bandwidth. When the bandwidth improves or increases the client may then switch to chunks from a higher quality version of the video. In this manner, the video stream can be dynamically adapted to the available bandwidth.

Two exemplary adaptive video chunking implementations are the Move Networks™ implementation and the Microsoft™ implementation. In the Move Networks™ implementation, one file is created for each chunk. Therefore each file represents a specific time frame and a specific bandwidth or quality. One problem with this particular implementation, however, is the large number of files that need to be created and managed. For example, if ten versions of a ten-minute video are created, and each version of the video is divided into two-second chunks, there will be 3000 chunks and thus 3000 separate files.

In the Microsoft™ implementation, referred to as Microsoft Smooth HD™, only one file is created for each bandwidth and ISO (International Organization for Standardization) MP4 (Moving Picture Expert Group-4) movie fragments (MOOF) are used to divide each file into chunks. The client then creates a HTTP URL (Uniform Resource Locator) that indicates the time period and the bandwidth (quality level) that it wishes to receive. A Microsoft IIS (Internet Information Services) server parses the request and retrieves the correct MOOF from the correct file.

The Microsoft™ implementation significantly reduces the number of files over the Move Networks™ implementation since there is only one file per bandwidth (quality) as opposed to one file per bandwidth per time period. However, the Microsoft™ implementation still requires multiple files per video. In addition, the Microsoft™ implementation demands an intelligent server that can parse the HTTP URL and retrieve the correct MOOF from the correct file.

Recently, a new video coding standard, referred to as Scalable Video Coding (SVC) was developed. SVC is an extension of the H.264/MPEG-4 AVC video compression standard. When a video file is SVC encoded, it is encoded into one or more layers, of differing quality. The layer with the lowest quality, referred to as the base layer, contains the most important part of the video stream. One or more enhancement layers may then be encoded to further refine the quality of the base layer. The enhancement layers are used for improving the spatial resolution (picture size), temporal resolution (frame rate), and the SNR (signal to noise ratio) quality of the base layer.

None of the existing adaptive video chunking implementations takes advantage of the features of SVC to optimize the encoding and file sizes.

SUMMARY

Embodiments disclosed herein relate generally to systems and methods for creating and retrieving scalable media files using a chunking model. Specifically, a plurality of network abstraction layer (NAL) units representing a scalable media presentation are grouped into a plurality of video chunks wherein each chunk represents only the NAL units of one layer and a specific time period. The plurality of video chunks are then stored in one or more scalable media files along with indexing information for retrieving the NAL units from each video chunk.

In one broad aspect, there is provided a method for generating a scalable media file. The method includes: (a) providing a plurality of network abstraction layer (NAL) units representing a scalable media presentation, each NAL unit being associated with one layer of a plurality of layers; (b) grouping the plurality of NAL units into a plurality of video chunks, each video chunk comprising the NAL units associated with only one layer for a specific time period of the scalable media presentation; (c) generating indexing information for each video chunk, the indexing information providing information for extracting the plurality of NAL units from the video chunk; and (d) storing the plurality of video chunks and the associated indexing information in at least one scalable media file.

In another broad aspect, there is provided a method for receiving a scalable media presentation over a communications network. The method includes: (a) transmitting a request from a client device to a server for a scalable media presentation; (b) receiving retrieval information from the server in response to the request for the scalable media presentation, the retrieval information providing information for retrieving a plurality of video chunks associated with the scalable media presentation, each video chunk comprising network abstraction layer (NAL) units associated with only one layer of a plurality of layers for a specific time period of the scalable media presentation; (c) selecting a time period of the scalable media presentation to retrieve; (d) selecting at least one video chunk associated with the selected time period based on the retrieval information; (e) transmitting a request to the server for the at least one video chunk; and (f) receiving the at least one video chunk and indexing information associated with the at least one video chunk from the server, the indexing information providing information for extracting the plurality of NAL units from the at least one video chunk;

and (g) extracting the NAL units from the at least one video chunk based on the indexing information associated with the at least one video chunk.

Further aspects and advantages of the embodiments described herein will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
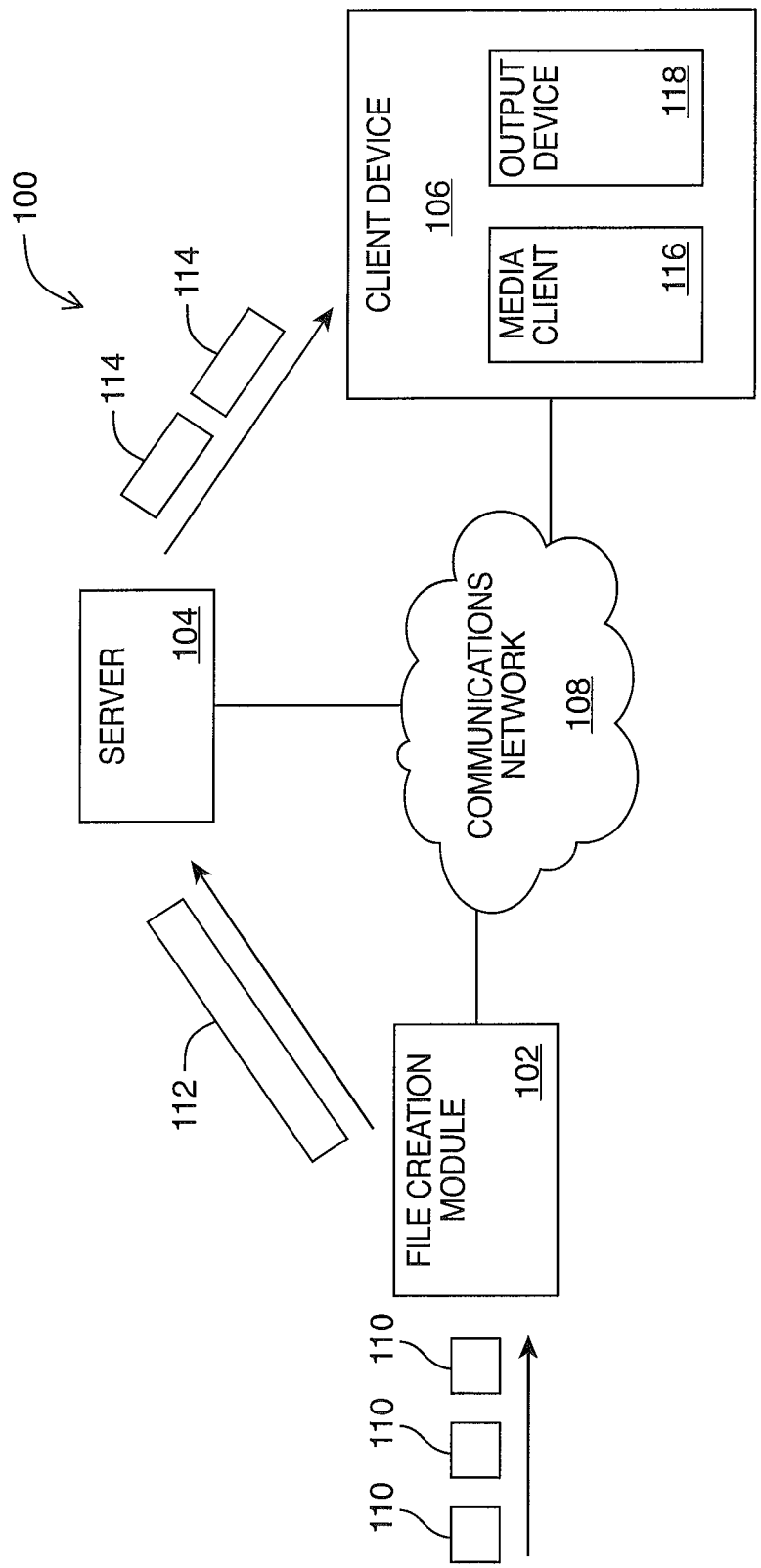
FIG. 1 is a block diagram of a system for creating and retrieving scalable media files in accordance with at least one embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Embodiments described herein relate to methods and systems for the creation and retrieval of scalable media files using a chunking model. Specifically, a plurality of network abstraction layer (NAL) units representing a scalable media presentation are grouped into a plurality of video chunks wherein each chunk represents only the NAL units of one layer and a specific time period. The plurality of video chunks are then stored in one or more scalable media files along with indexing information for retrieving the NAL units from each video chunk. In this manner, a client can request only the video chunks (and thus NAL units) that it needs or wants to achieve a specific bandwidth.

Reference is made to FIG. 1, which illustrates a system 100 for creating and retrieving scalable media files in accordance with an embodiment. The system 100 comprises a file creation module 102, a server 104 and a client device 106 connected by a communications network 108. While the system 100 is shown in FIG. 1 with a single file creation module 102, a single server 104, and a single client device 106, the system 100 may include multiple file creation modules 102, servers 104 and/or client devices 106. In addition, while the file creation module 102 and the server 104 are shown as separate entities, in some embodiments the same device may perform both the file creation module 102 and the server 104 functions.

The file creation module 102 receives a plurality of data units 110 representing at least a portion of scalable media presentation and groups the data units 110 into a plurality of chunks where each chunk represents the data units 110 for a specific time period. The file creation module 102 then stores the chunks in one or more scalable media files 112. The scalable media presentation may be a scalable video encoded using scalable video coding (SVC), or any other scalable media presentation such as a scalable audio presentation, or a scalable video encoded using any other encoding standard. A media presentation is considered to be scalable when data units of the media presentation can be removed in a way that the remaining data units form another valid media presentation for a receiving device, and the remaining data units form a lower quality representation of the original media presentation than that of the complete media presentation. Non-scalable media presentations are often referred to as single-layer media presentations.

SVC is an extension of the H.264/MPEG-4 AVC video compression standard. When a raw video is SVC encoded, it is encoded into one or more layers, of differing quality. The layer with the lowest quality, referred to as the base layer, contains the most important part of the video stream. One or more enhancement layers may then be encoded to further refine the quality of the base layer. The enhancement layers are used for improving the spatial resolution (picture size), temporal resolution (frame rate), and the SNR (signal to noise ratio) quality of the base layer. For example, a video that has been encoded with SVC may have ten layers (numbered 0 to 9) as shown in Table 1.

TABLE 1

| Layer | Resolution | Framerate | Bitrate | DID, TID, QID |
| --- | --- | --- | --- | --- |
| 0 (Base Layer) | 176 × 144 | 7.5 | 111.6 | (0, 0, 0) |
| 1 | 176 × 144 | 15 | 137.8 | (0, 1, 0) |
| 2 | 176 × 144 | 7.5 | 115.4 | (0, 0, 1) |
| 3 | 176 × 144 | 15 | 143.0 | (0, 1, 1) |
| 4 | 352 × 288 | 7.5 | 566.4 | (1, 0, 0) |

TABLE 1-continued

| Layer | Resolution | Framerate | Bitrate | DID, TID, QID |
|---|---|---|---|---|
| 5 | 352 × 288 | 15 | 697.3 | (1, 1, 0) |
| 6 | 352 × 288 | 30 | 819.7 | (1, 2, 0) |
| 7 | 352 × 288 | 7.5 | 582.7 | (1, 0, 1) |
| 8 | 352 × 288 | 15 | 716.0 | (1, 1, 1) |
| 9 | 352 × 288 | 30 | 842.8 | (1, 2, 1) |

An SVC encoded video stream is organized into NAL (Network Abstraction Layer) units. Each NAL unit has a DTQ (DID (dependency ID), TID (temporal ID), QID (quality ID)) value that represents a layer number. The DID denotes the inter-layer coding dependency hierarchy. The TID indicates the temporal layer (or frame rate) of the NAL unit. Generally a lower TID indicates a lower frame rate. The QID designates the quality level of the NAL unit.

In one embodiment, the scalable media presentation is an SVC-encoded video and the received data units are NAL units. In a preferred embodiment, the NAL units are grouped into a plurality of video chunks where each video chunk represents only those NAL units of a specific layer (i.e. DTQ value) for a specific time period. In some embodiments, the file creation module 102 also receives a plurality of audio samples corresponding to the SVC video. The audio samples may be grouped into a plurality of audio chunks where each audio chunk represents only those audio samples of a specific time period.

In addition to grouping the data units 110 (i.e. NAL units and/or audio samples) into a plurality of video and/or audio chunks, the file creation module 102 may also generate indexing information and retrieval information for the video and/or audio chunks. The indexing information provides information to assist a client device 106 in extracting the plurality of NAL units and/or audio samples from each video or audio chunk. The retrieval information provides information to a client device 106 for retrieving the video and/or audio chunks from the one or more scalable media files.

The file creation module 102 may operate in one of three fundamental modes. In the first mode, the file creation module 102 receives scalable media files that have already been created in an existing scalable format (i.e. SVC), extracts the data units (NAL units and/or audio samples), groups them into video and/or audio chunks, and stores the video and/or audio chunks in one or more scalable media files. The one or more scalable media files are then transferred to the server 104 where they can be retrieved on-demand by a client device 106.

In the second mode, the file creation module 102 accepts or connects to a live IP (Internet Protocol)-based media stream (i.e. an RTSP/RTP SVC-video stream) from an upstream media server or encoder and extracts the data units (NAL units and/or audio samples) from the live stream, groups the data units (NAL units and/or audio samples) into video and/or audio chunks on the fly, and adds the video and/or audio chunks to the one or more scalable media files as the video and/or audio chunks are created. In this second mode, the scalable media presentation video and/or audio chunks can be provided live to a client device 106. Typically in this mode, the file creation module 102 acts as the server 104 and receives and processes the requests from the client device 106 to ensure that the latest version of the one or more scalable media files are always available. Once the live stream has finished the one or more scalable media files may be transferred to a generic server, such a server 104, where they can be retrieved on-demand by a client device 106.

In the third mode, the file creation module 102 receives a live media feed (i.e. video feed) from an upstream video server, encodes the live media stream into a plurality of scalable media data units (i.e. SVC NAL units), groups the data units (i.e. NAL units) into video and/or audio chunks on the fly, and adds the chunks to the one or more scalable media files as the chunks are created. Similar to the second mode, typically in this third mode, the file creation module 102 acts as the server 104 and receives and processes the requests from the client device 106 to ensure that the latest version of the one or more scalable media files is always available. Once the live feed has finished the one or more scalable media files may be transferred to a generic server, such as server 104, where they can be retrieved on-demand by a client device 106.

The file creation module 102 may be implemented in hardware or software, or a combination of both. However, preferably, the file creation module 102 is implemented in computer programs executing on programmable computers each comprising at least one processor, a data storage system (including volatile and non-volatile memory and/or storage elements), at least one input device, and at least one output device. For example and without limitation, the programmable computers may be a personal computer or laptop. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the file creation module 102 is capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

An exemplary file creation module 102 will be described in reference to FIG. 2.

The server 104 receives the one or more scalable media files 112 generated by the file creation module 102 and stores it in memory so that the scalable media files 112 can be transferred to the client device 106 on-demand. Typically the server 104 receives a request for a specific scalable media presentation from the client device 106. The media server then obtains the retrieval information for the scalable media presentation and transmits it to the client device 106. The client device 106 then uses the retrieval information to determine which video and/or audio chunks it wants to retrieve. The client device 106 then sends the server 104 a request for one or more video and/or audio chunks. Upon receiving the request, the server 104 retrieves the requested video and/or audio chunks from the one or more scalable media files 112 and transmits them to the client device 106.

The process then repeats until the client device 106 has retrieved the entire scalable media presentation or the client device 106 no longer wishes to view or listen to the scalable media presentation. Specifically, the client device 106 uses the retrieval information to select the next video and/or audio chunks to retrieve, the client then requests the selected video and/or audio chunks, upon receiving the request, the server 104 retrieves the requested video and/or audio chunks from the one or more scalable media files and transmits them to the client device 106.

In one embodiment, the server 104 is a HTTP (Hypertext Transfer Protocol) server (also known as a web server) and the video and/or audio chunk requests received from the client device 106 are HTTP byte range requests. In this embodiment, the server 104 does not need to know anything about the structure of the scalable media files 112 to retrieve the requested video and/or audio chunks. It simply retrieves the specified byte range or ranges from the specified scalable media file or files. The server 104 may be implemented by the use of one or more general-purpose computers, such as, for example, a Sun Microsystems™ F15K server.

The client device 106 retrieves the video and/or audio chunks 114 of a scalable media presentation from the server 104 in the proper order and feeds the retrieved video and/or audio chunks 114 to a decoder to provide a smooth flowing presentation (i.e. video). The client device 106 may comprise a media client 116 and an output device 118.

The media client 116 is responsible for retrieving the video and/or audio chunks 114 from the server 104, decoding them, and providing a smooth flowing presentation (i.e. video) to the output device 118. The details of how the media client 116 retrieves the video and/or audio chunks 114 will be described in detail in reference to FIGS. 10 and 11.

The media client 116 may be implemented in hardware or software, or a combination of both. However, preferably, the media client 116 is implemented in computer programs executing on programmable computers each comprising at least one processor, a data storage system (including volatile and non-volatile memory and/or storage elements), at least one input device, and at least one output device. For example and without limitation, the programmable computers may be a personal computer or laptop. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the media client 116 is capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

The output device 118 receives the decoded media presentation from the media client 116 and outputs the presentation to the user of the client device 106. In some embodiments, the output device 118 comprises a display module for displaying a video and a speaker module for outputting the audio associated with the video.

Figure 2:
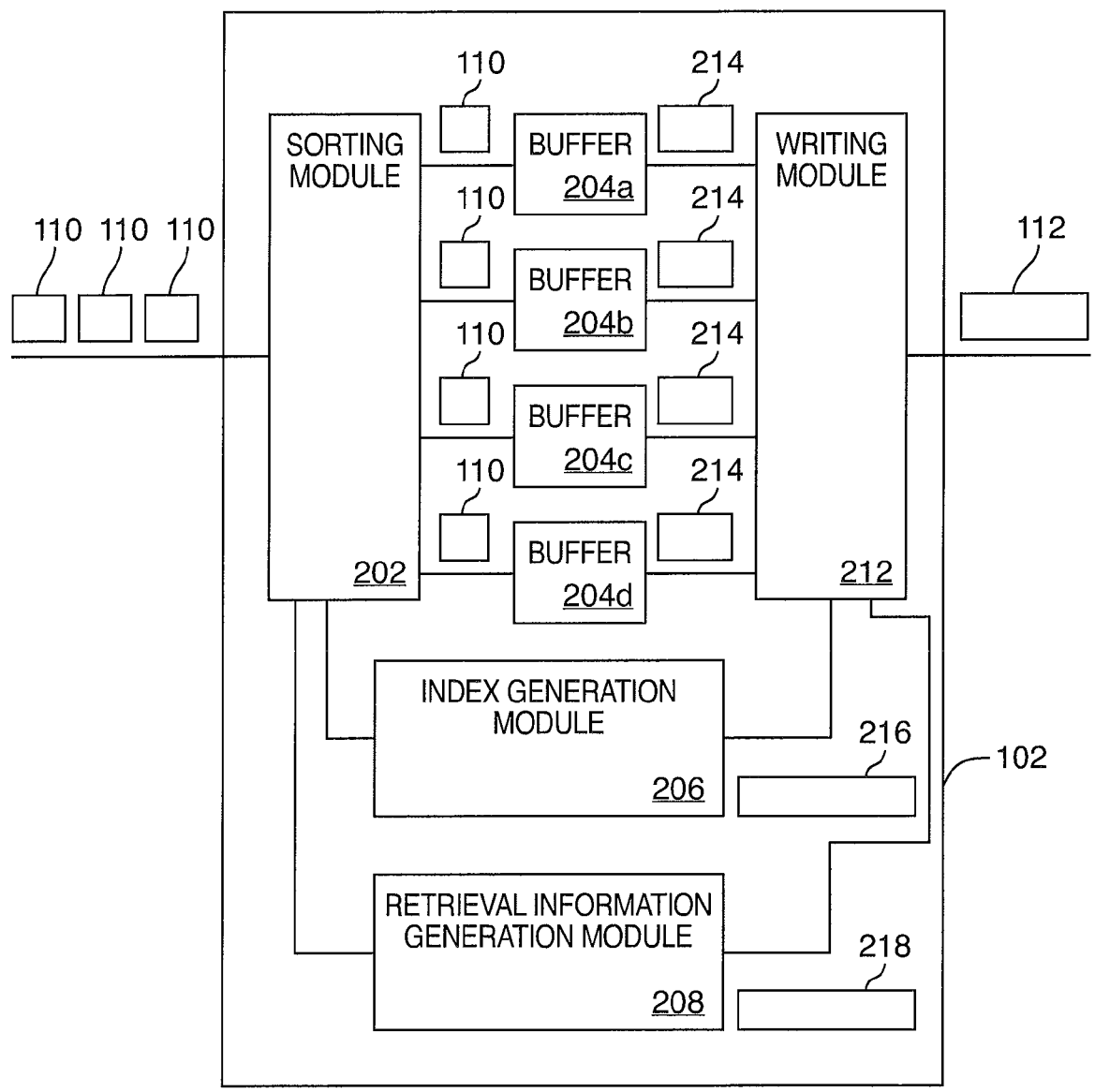
FIG. 2 is a block diagram of the file creation module of FIG. 1 in accordance with at least one embodiment.

Reference is now made to FIG. 2, which illustrates the file creation module 102 of FIG. 1 in accordance with an embodiment. The file creation module 102 comprises a sorting module 202, a plurality of buffers 204a to 204d, an index generation module 206, a retrieval information generation module 208, and a writing module 212.

The sorting module 202 receives a plurality of data units 110 representing at least a portion of a scalable media presentation and sorts the data units 110 into one of the plurality of buffers 204a to 204d until all of the data units 110 representing a certain time period of the scalable media presentation have been sorted. For example, the sorting module 202 may sort the data units 110 in 5-second blocks. In some cases, it is desirable for the first data unit of any time period to be an I-frame, thus the sorting module 202 may continue to sort data units 110 into the buffers 204a to 204d after the time period has elapsed until it receives the next I-frame.

Once all of the data units representing a certain time period of the scalable media presentation have been sorted, the sorting module 202 provides the contents of the buffers 204a to 204d (the contents of each buffer representing a chunk 214) to the writing module 212 to be written to one or more scalable media files 112. The sorting module 202 then sorts the next set of data units 110 until all of the data units 110 representing the next time period have been sorted and so on.

In a preferred embodiment, the data units 110 are NAL units representing an SVC-encoded video and the sorting module 202 sorts the NAL units based on the layer (DTQ value). In this manner, the NAL units of the same layer are grouped together to form a video chunk.

In some embodiments, the data units 110 may also comprise audio samples that represent one or more versions of the corresponding audio. Where there is only one version of the audio, typically all of the audio samples will be sent to the same buffer. Where, however, there are multiple versions of the audio (i.e. multiple audio tracks), the audio samples will typically be sorted based on the audio quality. For example, all of the audio samples corresponding to a first quality or first bandwidth may be sent to one buffer, and all of the audio samples corresponding to a second quality of a second bandwidth may be sent to a second buffer. Typically sorting module 202 receives the NAL units and audio samples as separate data streams. However, the NAL units and audio samples typically contain information that allows synchronization of the video and audio.

The index generation module 206 generates indexing information 216 for each video and audio chunk. The indexing information 216 provides information to assist a media client (e.g. media client 116) in extracting the plurality of NAL units and/or audio samples from each video or audio chunk. The indexing information 216 may comprise one or more of the following for each NAL or audio sample in the video or audio chunk: a decoding order number specifying the order in which to decode the associated NAL unit or audio sample; a timestamp value specifying when the associated NAL unit or audio sample should be rendered on the client; an offset specifying the location (e.g. byte offset) of the start of the NAL unit or audio sample in the video or audio chunk; and length information specifying the length (e.g. number of bytes) of the NAL unit or audio sample. Exemplary indexing information 216 will be described in reference to FIG. 3. In some embodiments, the same device performs the sorting module 202 and index generation module 206 functions. In other embodiments, separate devices perform the sorting module 202 and index generation module 206 functions.

The retrieval information generation module 208 generates retrieval information 218. The retrieval information 218 provides information to a media client (e.g. media client 116) for retrieving the video and/or audio chunks from the one or more scalable media files 112. In a preferred embodiment, the retrieval information 218 provides a byte range for each video and audio chunk of the scalable media presentation so that the media client 116 can retrieve the video and/or audio chunks it wants via HTTP byte-range requests.

The structure of the retrieval information 218 may be based on the existing ISO MP4 container format defined for AVC and SVC. The general structure of the ISO format is based on a hierarchical structure of data contained in a structure referred to as a box. Boxes can be only a single layer or may contain many layers of sub-boxes.

In one embodiment, the retrieval information 218 comprises multiple byte range boxes and one byte range index box. In this embodiment, there is typically one byte range box for each non-overlapping time period of the scalable media presentation. Each byte range box lists the byte ranges of the video and/or audio chunks for that time period. Each byte range box may also include other information that the media client (e.g. media client 116) may use in the retrieval process. For example, the byte range boxes may also include the first frame number of the chunks, the maximum number of frames in any chunk, the number of audio tracks available, and the start and end sample number for each available audio track. An exemplary byte range box will be described in reference to FIG. 6.

The byte range index box links or maps the order of the byte ranges of the byte range boxes to a type of media (audio, video etc.) and to a video layer or an audio track number. For example, the byte range index box may indicate the following: (i) the first byte range in any byte range box corresponds to a video chunk containing NAL units of Layer 0 (L0); (ii) the second byte range in any byte range box corresponds to a video chunk containing NAL units of Layer 1 (L1); and (iii) the third byte range in any byte range box corresponds to an audio chunk containing audio samples of a first audio track.

The byte range index box allows the video and audio chunks to be rearranged within the scalable media file(s) without having to change the media client (e.g. media client 116). Specifically, it allows the re-ordering of the video chunks to allow for more optimized retrieval. For example, the video chunks may be placed in a contiguous manner in the scalable media file(s) to minimize the number of byte-range requests made by the client device 106 and to maximize the amount of data that is obtained per request. An exemplary byte range index box will be described in reference to FIG. 7.

In other embodiments, there is no separate byte range index box and the order of the byte ranges (and video and audio chunks) in the byte range boxes is fixed. In these embodiments, the order of the byte ranges may be may be hard-coded into the media client (e.g. media client 116), for example.

In some embodiments, the retrieval information 218 may further comprise a file name box. The file name box provides the name or names of the scalable media file or files, which house the video and/or audio chunks. In some cases the file name box provides not only the name or names of the primary scalable media file or files, but also the name or names of at least one secondary or backup scalable media file or files. For example, when the received data units represent a live scalable media presentation there will typically be at least two file creation modules 102 generating a set of scalable media files. If one of the file creation modules 102 fails, then it is beneficial for the media client 116 to know how to connect to the secondary scalable media file or files.

A file name box may not be needed when the received data units represent a scalable media presentation that is being prepared for video on demand. In such a case, the media client (e.g. media client 116) may be able to determine the name or names of the scalable media file based on the name of the file containing the retrieval information. For example, where the retrieval information is stored in one file and all of the video and audio chunks are stored in another file, the media client may only need to convert the extension of the retrieval information file to get the correct file name for the video and/or audio chunks. In addition, once the set of scalable media files have been generated they can be duplicated with the same name on multiple servers for redundancy.

In some embodiments, the retrieval information 218 may further comprise an authorization box. The authorization box may set out the functionality the media client (e.g. media client 116) is authorized to access as well as any policies associated with the scalable media presentation. For example, the authorization box may comprise a play type field, a start layer field, a functionality allowed field and a loop playback field.

The play type field may specify the type of the scalable media presentation. For example, the play type field may specify whether the scalable media presentation is an on-demand presentation, a broadcast of a pre-encoded presentation, or a broadcast of a live presentation. In some embodiments, a value of zero indicates an on-demand presentation, a value of one indicates a broadcast of a pre-encoded presentation, and a value of two indicates a broadcast of a live presentation. In some embodiments the play type field has a fixed length of five bits, for example.

The start layer field may specify the maximum video layer that the media client (e.g. media client 116) should start with. In some cases the media client may be limited to a maximum bandwidth until they pay an additional fee or are otherwise granted authorization to access the higher bandwidth layer or layers. In some embodiments, the start layer field has a fixed length of ten bits, for example.

The functionality allowed field may specify the track play features that the media client (e.g. media client 116) is allowed to perform. For example, the functionality allowed field may specify whether the media client has the ability to rewind, fast forward etc. In some embodiments, the first bit indicates whether the media client is allowed to perform all functions, the second bit indicates whether the media client is allowed to rewind the scalable media presentation, and the third bit indicates whether the media client is allowed to fast forward the scalable media presentation. In some embodiments, the functionality field may have a fixed length of eight bits, for example.

The loop playback field may specify whether the media client is to continually loop the scalable media presentation. In some cases, a value of 1 indicates that the scalable media presentation shall be looped and a value of 0 indicates that the scalable media presentation shall not be looped. In some embodiments, the loop playback field may have a fixed length of one bit, for example.

In some embodiments, the retrieval information 218 may further comprise a time box that is periodically updated. The time box may provide the current time period for live and broadcast scalable media presentations. This tells the client device 106 what time period of the scalable media presentation to retrieve so that all of the client devices will be viewing or listening to the same portion of the scalable media presentation at roughly the same time. For example, the time box may comprise a current time field which specifies the current time period in fragment numbers. Fragments will be described in further detail below in relation to the writing module. In some embodiments, the current time field has a fixed length of 32 bits, for example.

The writing module 212 receives the video and audio chunk data 214 from the buffers 204a to 204d, the indexing information 216 from the index generation module 206, and the retrieval information 218 from the retrieval information generation module 208 and writes the video and audio chunk data 214, the indexing information 216 and the retrieval information 218 to one or more scalable media files 112.

In one embodiment each video and audio chunk (including the associated indexing information) is stored in a separate scalable media file.

In other embodiments, the video and audio chunks (including the associated indexing information) are grouped into fragments, where a fragment comprises all of the video and audio chunks corresponding to a specific time period of the scalable media presentation. Each fragment may then be stored in a separate scalable media file.

In still a further embodiment, all of the video and audio chunks (including the associated indexing information) are grouped into fragments and all of the fragments are stored in a single scalable media file. The structure of a scalable media file in accordance with this embodiment will be described in reference to FIG. 8.

In some embodiments, the writing module 212 stores the retrieval information 218 or at least a portion of the retrieval information 218 in the same scalable media file(s) as the video and/or audio chunks. In other embodiments, the writing module 212 stores the retrieval information 218 in a separate file from the video and audio chunks.

For example, where the scalable media presentation is to be available for on-demand viewing (i.e. where all of the video and/or audio chunks, indexing information and retrieval information is generated in advance of a client device 106 requesting the scalable media presentation) the retrieval information 218 may be stored in the same file or files as the video and/or audio chunks.

However, such a model would not typically work very well where the scalable media presentation is to be provided live. Specifically, since new video and/or audio chunks and corresponding retrieval information are being added to the scalable media file or files 112 on the fly, the offset of the video and/or audio chunks would change as they are being pushed further and further back in the scalable media file(s). Accordingly, in the "live" cases the retrieval information 218 may be stored in a separate scalable media file from the video and/or audio chunks. In this way both the retrieval information and the video and/or audio chunk information can grow on the fly without affecting the other.

In addition, in the "live" case (e.g. operational mode two or three) the file creation module 102 generates the video and/or audio chunks and the corresponding retrieval information on the fly. Therefore, when a client device 106 makes an initial request for the retrieval information 218, the retrieval information 218 will not contain information on how to retrieve all of the video and/or audio chunks of the scalable media presentation, since not all of the video and/or audio chunks have been created. Accordingly, the client device 106 will typically have to make multiple requests for the retrieval information 218 to get the latest retrieval information 218 (i.e. the retrieval information 218 related to the newest video and/or audio chunks).

To avoid the client device 106 having to make repeated requests for the retrieval information 218, in some embodiments, a portion of the retrieval information 218 is stored within one or more video and/or audio chunks. Specifically, in one embodiment, each video chunk associated with the base layer (e.g. layer 0) will further comprise the byte range box for at least one subsequent time period. The byte range box for the at least one subsequent time period is typically included in the video chunk associated with the base layer because all higher video layers are dependent on the base layer. Accordingly, a client device 106 will always have to retrieve the video chunk associated with the base layer to be able to view the video. This means that the client device 106 will only have to make a single request to get both the base layer video chunk and the subsequent time period retrieval information. Accordingly, after the client device 106 downloads the retrieval information at the beginning of the process, the client device 106 can rely on the retrieval information in the base layer video chunk to retrieve the video and/or audio chunks of the subsequent time period.

Figure 3:
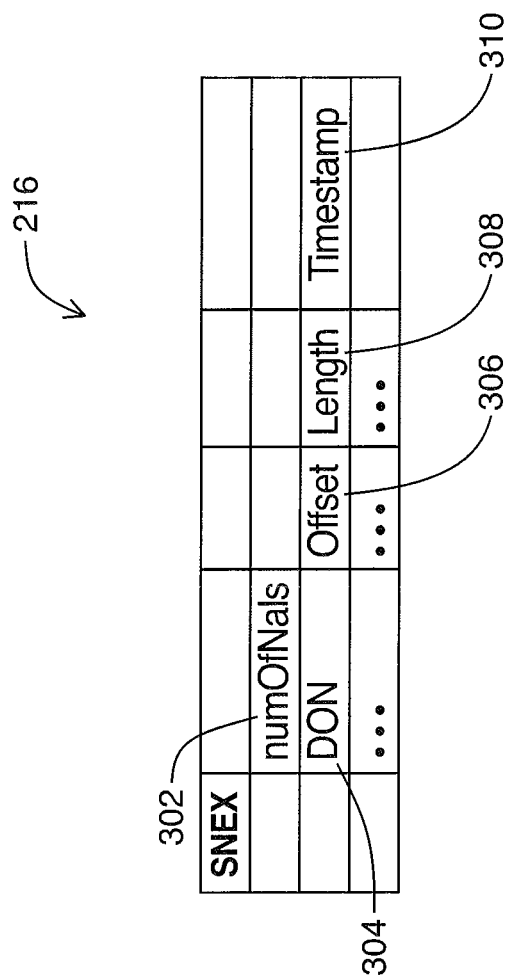
FIG. 3 is a schematic diagram illustrating the structure of indexing information in accordance with at least one embodiment.

Reference is now made to FIG. 3, which illustrates indexing information 216 in accordance with an embodiment. The indexing information 216 comprises a number of NALs field 302, and a decoding order number (DON) field 304, an offset field 306 and a length field 308 for each NAL unit or audio sample in the video or audio chunk and a timestamp field 310.

The number of NALs field 302 specifies the number of NAL units or audio samples in the corresponding video or audio chunk. In some embodiments, the number of NALs field 302 has a fixed length of 32 bits, for example.

The decoding order number (DON) field 304 specifies the order in which the associated NAL or audio sample should be decoded. There is typically one DON field 304 for each NAL unit or audio sample in the video or audio chunk. When a video is encoded by SVC, the result is a series of NAL units that must be presented to a decoder in a specific order to properly decode and display the video. Due to the fact that NAL units of certain layers depend on NAL units of lower layers, the order typically intermixes NAL units of different layers. An exemplary SVC-encoded video stream will be described in reference to FIG. 4.

Since the NAL units themselves do not include any information about their ordering, once the NAL units are taken out of their original order (e.g. when they are sorted by layer) additional information is typically required to put the NAL units back into the appropriate order. In some embodiments, this is accomplished through the use of the DON field 304. The DON field 304 specifies the order in which the associated NAL unit should be decoded. The DON typically spans across all of the video chunks for a specific time period. In this manner all of the NAL units for that time period can be placed in their appropriate decoding order. In some embodiments, the DON counter is reset at the beginning of each time period so that the size of the DON field does not have to be very large. In other embodiments, the DON counter spans the entire length of the video. An exemplary set of DONs will be described in reference to FIG. 5.

In some embodiments, where the audio samples represent non-scalable audio, the indexing information 216 for each audio chunk may not contain a DON field 304 for each audio sample. For example, where the audio is non-scalable there is only one audio chunk per time period. Accordingly all of the audio samples for a particular time period can be placed in order within the audio chunk. This allows the audio samples to be placed in the correct decoding order without any additional decoding order information.

The offset field 306 identifies where within the video or audio chunk the corresponding NAL unit or audio sample begins. Typically the offset is described in terms of a byte offset. However, the offset may be described using other suitable units of measurement. In some embodiments, the offset field 306 has a fixed length of 32 bits, for example.

The length field 308 specifies the length of the associated NAL unit or audio sample. The length is typically described in bytes, but it may be described using other suitable metrics. In some embodiments, the length field 308 has a fixed length of 32 bits, for example. A media client (e.g. media client 116) can use the offset field 306 and the length field 308 to retrieve the associated NAL unit or audio sample from the video or audio chunk. The timestamp field 310 specifies the presentation time of the associated NAL unit or audio sample.

Figure 4:
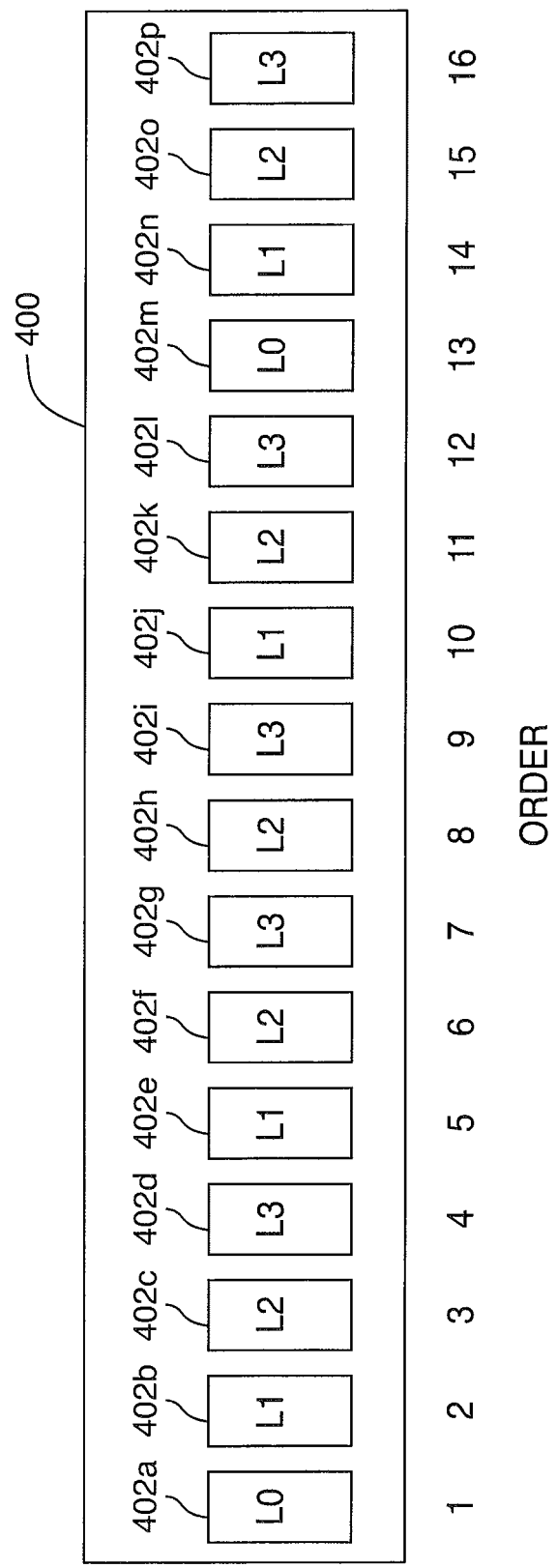
FIG. 4 is a block diagram of an SVC-encoded video stream in accordance with the prior art.

Reference is now made to FIG. 4, which illustrates an exemplary SVC-encoded video stream 400 comprising sixteen NAL units 402a to 402p each associated with one of four layers (identified as L0 to L3). It can be seen that the order of the NAL units 402a to 402p is as follows L0-L1-L2-L3-L1-L2-L3-L2-L3-L1-L2-L 3-L0-L1-L2-L3.

Figure 5:
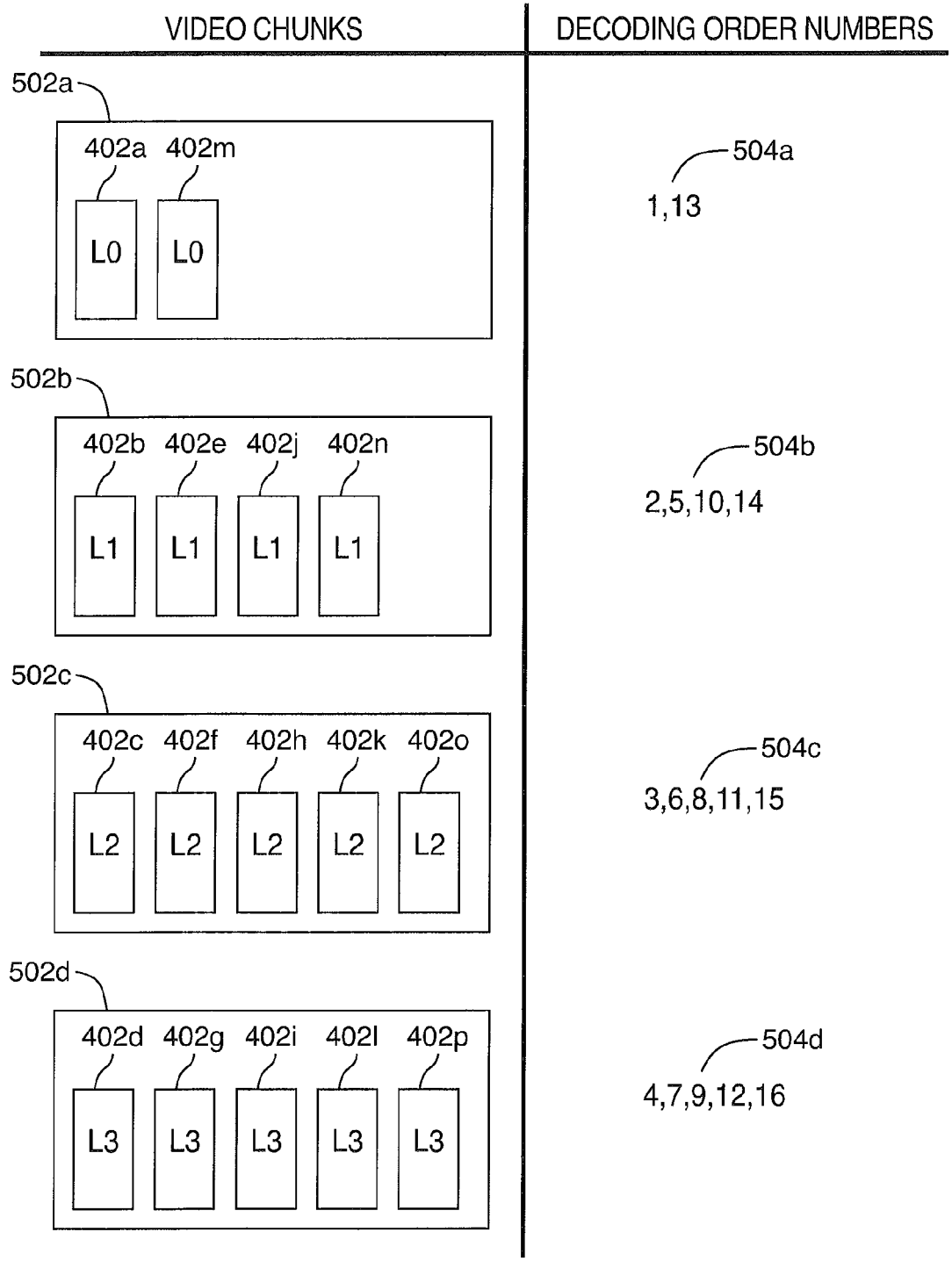
FIG. 5 is a schematic diagram illustrating a plurality of video chunks and the associated decoding order numbers in accordance with at least one embodiment.

Reference is now made to FIG. 5, which illustrates a plurality of video chunks 502a to 502d comprising the NAL units 402a to 402p of FIG. 4 and the associated DONs 504a to 504d for each video chunk 502a to 502d. It can be seen that the NAL units 402a to 402p have been sorted into a plurality of video chunks 502a to 502d, one chunk for each layer of the SVC-video. Accordingly, since there are four layers (number L0 to L3) there are four corresponding video chunks 502a to 502d. The first video chunk 502a comprises the NAL units corresponding to layer 0 (L0). We can see that the first video chunk 502a comprises only two NAL units 402a and 402m. The second video chunk 502b comprises the NAL units corresponding to layer 1 (L1). We can see that the first video chunk 502a comprises four NAL units 402b, 402e, 402j and 402n. The third video chunk 502c comprises the NAL units corresponding to layer 2 (L2). We can see that the third video chunk 502c comprises five NAL units 402c, 402f, 402h, 402k and 402o. The fourth video chunk 502d comprises the NAL units corresponding to layer 3 (L3). We can see that the fourth video chunk 502d comprises five NAL units 402d, 402g, 402i, 402k and 402p.

The DONs for each video chunk 504a to 504b can be determined from FIG. 4. Specifically, the DONs for the first video chunk 504a are 1 and 13, the DONs for the second video chunk 504b are 2, 5, 10 and 14, the DONs for the third video chunk 504c are 3, 6, 8, 11 and 15, the DONs for the fourth video chunk 504d are 4, 7, 9, 12 and 16. As described above, the DONs can be used to put the NAL units back into the original order. Since the DONs span NAL units of different layers, if the client device 106 does not retrieve all of the layers there will be gaps in the DONs. To deal with this situation the media client 116 will be configured to order the NAL units based on the DONs regardless of whether there are gaps in the DONs.

Figure 6:
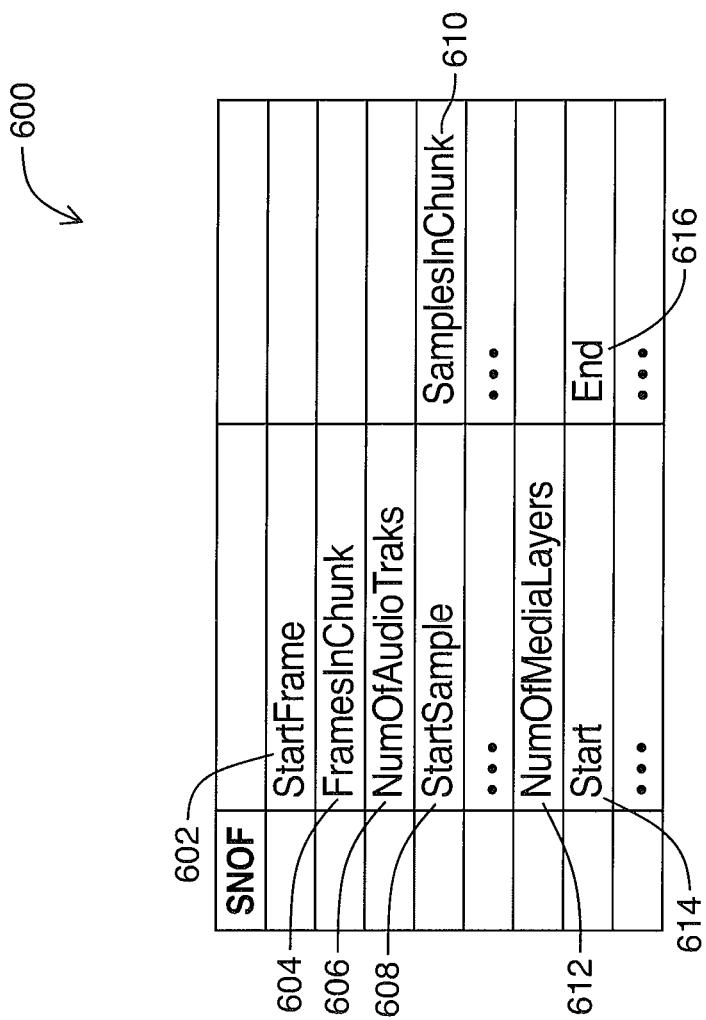
FIG. 6 is a schematic diagram illustrating the structure of a byte range box in accordance with at least one embodiment.

Reference is now made to FIG. 6, which illustrates a byte range box 600 in accordance with an embodiment. The byte range box 600 comprises a start frame field 602, a frames in chunk field 604, a number of audio tracks field 606, a start sample field 608 and a samples in chunk field 610 for each audio track, a number of media layers field 612, and start and end fields 614 and 616 for each layer of the video and for each audio track.

The start frame field 602 specifies the frame number for the first frame in the time period. This frame number is the frame number from the beginning of the video. The start frame field 602 information assists the client device 106 in determining where in the overall video the corresponding time period is. For example, the start frame field 602 information may help the client device 106 determine whether the corresponding time period is near the start or end of the video. In some embodiments, the start frame field 602 has a fixed length of 32 bits, for example.

The frames in chunk field 604 indicates the maximum number of frames in the corresponding time period. Typically, the frames in chunk field 604 information is based on the number of frames in the video at the highest layer (e.g. Layer 9 (L9)) for the corresponding time period. This typically includes any additional frames required to get to the next I-Frame. In some embodiments, the frames in chunk field 604 has a fixed length of 32 bits, for example.

The number of audio tracks field 606 indicates the number of separate audio tracks available. As described above, there may be multiple audio tracks of differing quality (i.e. audio tracks with different bandwidth) that the client may select between. In some embodiments, the number of audio tracks field 606 has a fixed length of sixteen bits, for example.

The start sample field 608 indicates the sample number of the first sample in the associated audio chunk. This sample number is the sample number from the beginning of the audio. There is typically one start sample field 608 for each audio track. In some embodiments, the start sample field 608 has a fixed length of 32 bits, for example.

The samples in chunk field 610 indicates the number of audio samples in the associated audio chunk. There is typically one samples in chunk field 610 for each audio track. In some embodiments, the samples in chunk field 610 has a fixed length of 32 bits, for example.

The number of media layers field 612 indicates the total number of layers available for this time period. The total number of layers is typically the sum of the number of video layers available and the number of audio tracks available. In some embodiments, the number of media layers field 612 has a fixed length of 16 bits, for example.

The start field 614 indicates the byte offset for the start of a video or audio chunk. Where, for example, all of the video and audio chunks are stored in a single scalable media file, the start field 614 indicates where in the single scalable media file the specific video or audio chunk starts. There is typically one start field 614 for each video and audio chunk associated with the time period. In some embodiments, the start field 614 has a fixed length of 64 bits, for example.

The end field 616 indicates the byte offset for the end of a video or audio chunk. Where, for example, all of the video and audio chunks are stored in a single scalable media file, the end field 616 indicates where in the single scalable media file the video or audio chunk ends. There is typically one end field 616 for each video and audio chunk associated with the time period. In some embodiments, the end field 616 has a fixed length of 64 bits, for example. Together each pair of start and end fields 614 and 616 identifies the byte range for each video or audio chunk associated with the time period.

Figure 7:
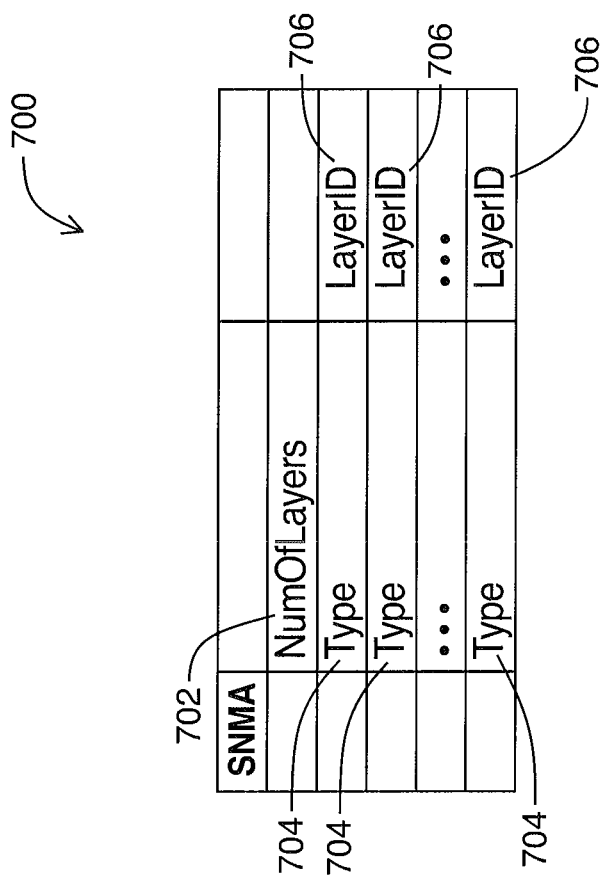
FIG. 7 is a schematic diagram illustrating the structure of a byte range index box in accordance with at least one embodiment.

Reference is now made to FIG. 7, which illustrates an exemplary byte range index box 700 in accordance with an embodiment. The byte range index box 700 includes a number of layers field 702, a plurality of type fields 704, and a plurality of layer ID fields 706. There is typically one type field 704 and one layer ID field 706 for each byte range listed in the byte range boxes. The order of the type fields 704 and layer ID fields 706 corresponds to the order of the byte ranges listed in the byte ranges boxes. For example, the first type field and the first layer ID field correspond to the first byte range in the byte range boxes and the second type field and the second layer ID field correspond to the second byte range in the byte ranges boxes.

The number of layers field 702 indicates the total number of layers available. The total number of layers is typically the sum of the number of video layers available and the number of audio tracks available. In some embodiments, the number of layers field 702 has a fixed length of 16 bits, for example.

The type field 704 indicates the media type (e.g. audio, video, closed captioning etc.) of the corresponding byte range. In some embodiments, a value of zero indicates the corresponding byte range is video, and a value of one indicates that the corresponding byte range is audio. In some embodiments, the type field 704 has fixed length of 6 bits, for example.

The layer ID field 706 indicates the layer number or track number of the corresponding byte range. For example, where the corresponding byte range is a video chunk, the layer ID field 706 specifies which layer the video chunk is associated with, and where the corresponding byte range is an audio chunk, the layer ID field 706 specifies which audio track number the audio chunk is associated with. In some embodiments, the layer ID field 706 has a fixed length of 10 bits, for example.

Figure 8:
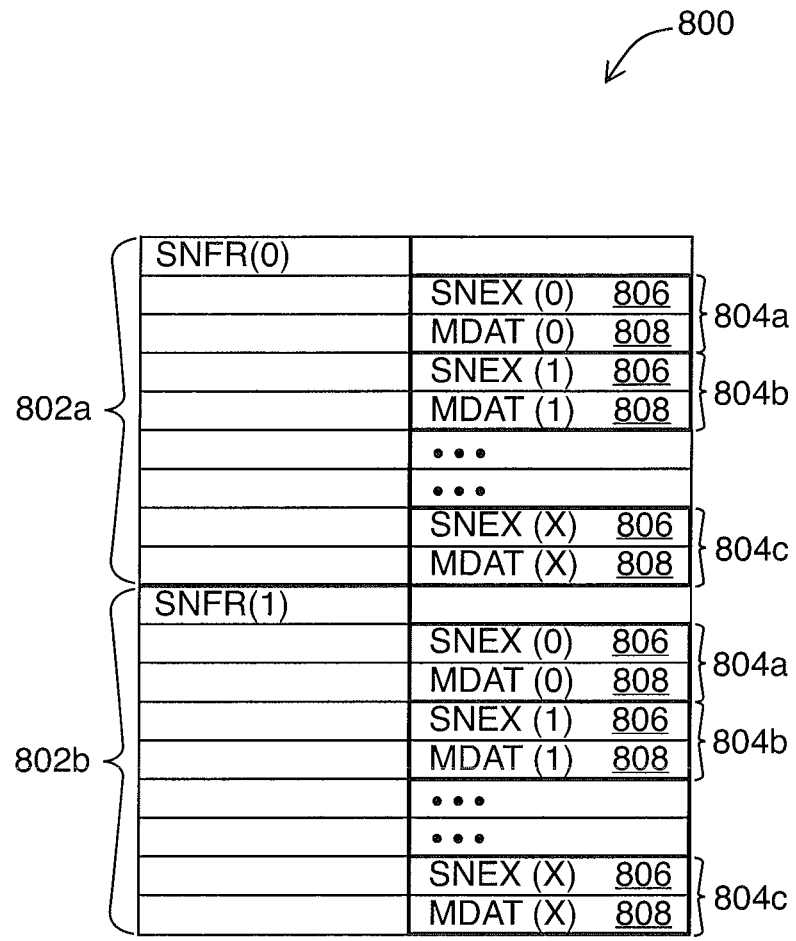
FIG. 8 is a schematic diagram illustrating the structure of a scalable media file in accordance with at least one embodiment.

Reference is now made to FIG. 8, which illustrates a scalable media file 800 in accordance with an embodiment. The scalable media file 800 comprises a plurality of fragments 802a and 802b. Each fragment 802a and 802b is a container for all video and/or audio chunks 804a to 804c corresponding to a specific time period Ti of the scalable media presentation. The fragments 802a and 802b are typically organized in the scalable media file 800 in temporal order. For example, as shown in FIG. 8, the fragment 802a for time zero (T0) appears in the scalable media file 800 before to the fragment 802b for time one (T1).

In some embodiments, the video and/or audio chunks 804a to 804c may be organized within each fragment in order of their layer number. For example, a video chunk corresponding to layer 0 (L0) may be placed in the scalable media file 800 before the video chunk corresponding to layer 1 (L1). In other embodiments, the video and/or audio chunks may be arranged within each fragment based on the inter-dependencies of the layers to minimize the number of byte range requests made by the media client 116. As described above, there are inter-dependencies between video layers that are not always contiguous. These inter-dependencies can be used to organize the video chunks to minimize (i) the number of byte range requests made by the media client 116 to obtain some of the higher layers; and (ii) the number of times the server 104 must access the scalable media file or files to retrieve the requested chunks. For example, if layer 7 is dependent on layer 4, 2 and 0, it may be beneficial to place the video chunks corresponding to layers 7, 4, 2 and 0 contiguously in the scalable media file 800 so that when a media client 116 wants to retrieve layer 7, it can retrieve layers 7, 4, 2 and 0 in one single byte range request. In either embodiment, the order of the video and/or audio chunks within each fragment 802a and 802b is reflected in the byte range index box of the retrieval information 218.

In one embodiment, each video and/or audio chunk comprises two components: the indexing information 806, and the data units 808 (NAL units or audio samples). Typically the indexing information 806 is placed in the scalable media file before the corresponding data units 808. This enables the media client to quickly obtain the indexing information, which can be used to extract the data units (NAL units or audio samples) from the video or audio chunk. The byte ranges provided in the byte range boxes typically encompass both the indexing information 806 and the data units 808.

Typically the data units 808 of each video or audio chunk are placed in the file in time ordered sequence. However, when the indexing information comprises ordering information, such as a DON for each NAL unit or audio sample, the data units (NAL units or audio samples) may be placed in any order.

Figure 9:
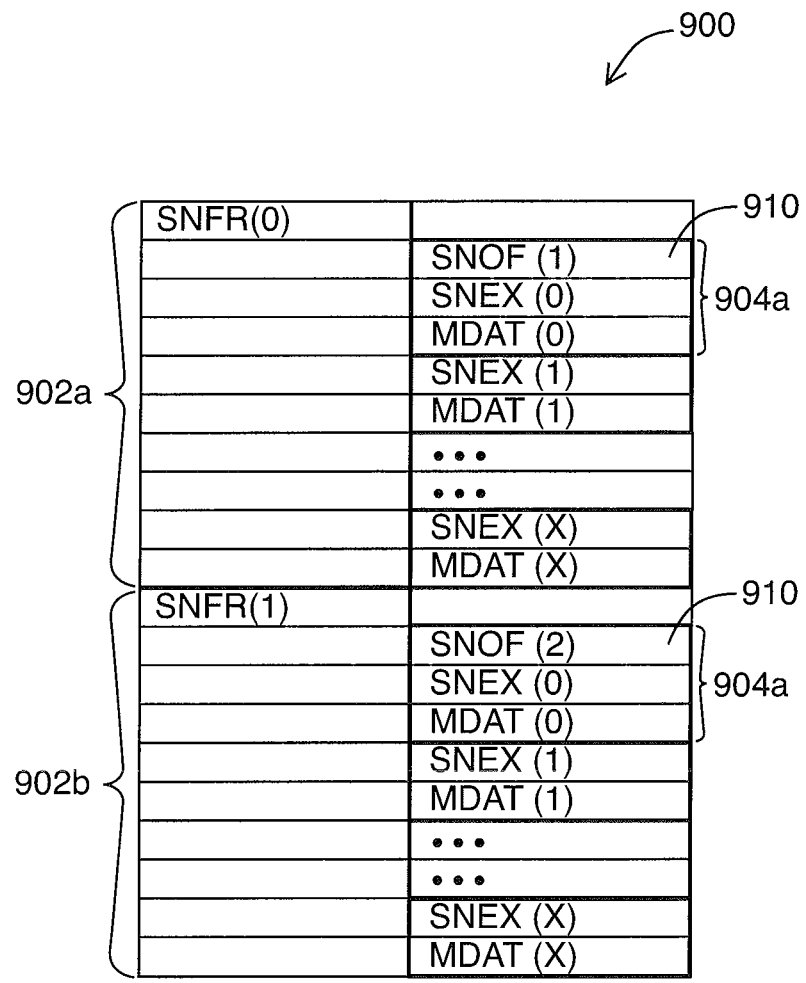
FIG. 9 is a schematic diagram illustrating the structure of a scalable media file in accordance with an alternate embodiment.

Reference is now made to FIG. 9, which illustrates a scalable media file 900 in accordance with another embodiment. Scalable media file 900 is identical to scalable media file 800 except that the first chunk 904a of each fragment 902a and 902b further comprises the byte range box 910 of the subsequent fragment or time period. For example, the video chunk for layer zero (L0) for time period 0 (T0) comprises the byte range box for time period 1 (T1), and the video chunk for layer zero (L0) for time period 1 (T1) comprises the byte range box for time period 2 (T2). As described above, the byte range box typically includes the byte ranges for the video and/or audio chunks for the corresponding time period.

Figure 10:
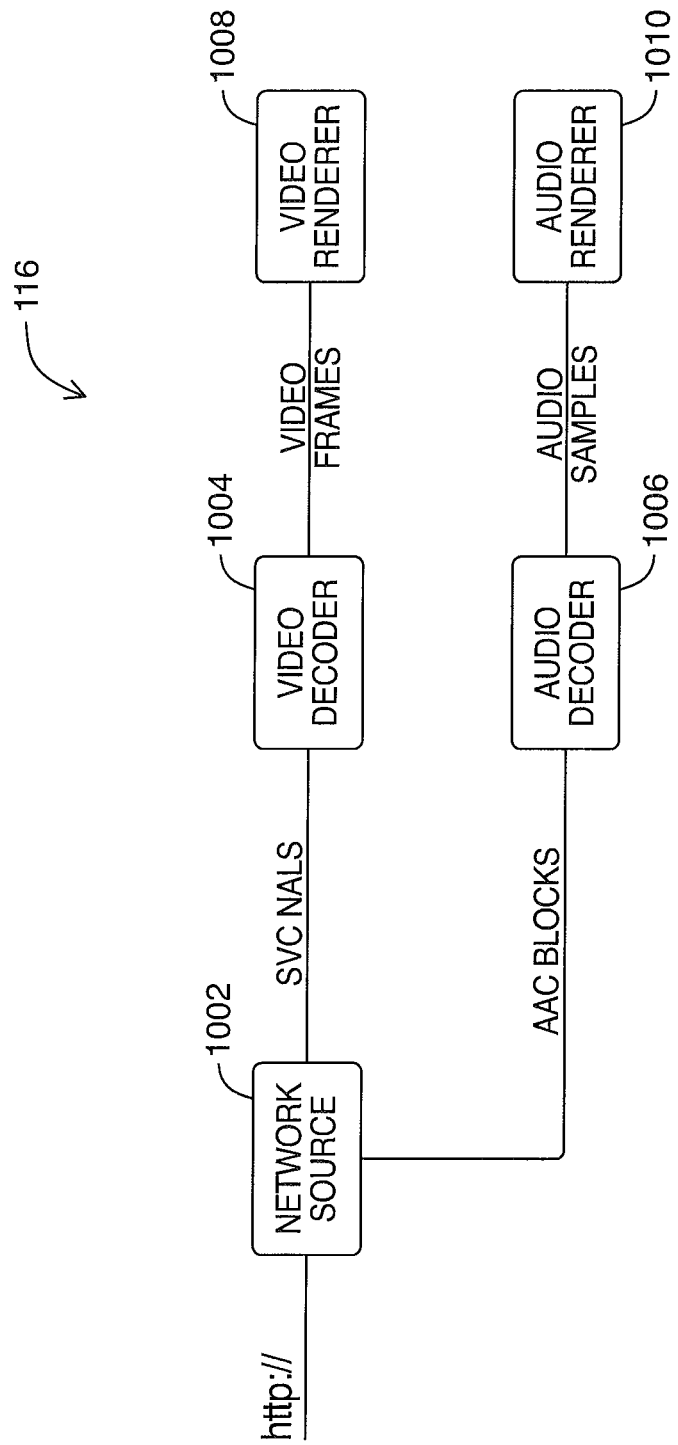
FIG. 10 is a block diagram of the media client of FIG. 1 in accordance with at least one embodiment.

Reference is now made to FIG. 10, which illustrates the media client 116 of FIG. 1 in accordance with an embodiment. The media client 116 comprises a network source 1002, a video decoder 1004, an audio decoder 1006, a video renderer 1008 and an audio renderer 1010.

The network source 1002 is responsible for receiving or retrieving media data (e.g. the video and audio data) from a server (e.g. server 104) and then converting the received media data into a format suitable for processing by the video and audio decoders 1004 and 1006. For example, the network source 1002 may request the retrieval information from the server, select the time period it wants to retrieve, select the video and/or chunks associated with the selected time period based on the retrieval information, request the selected video and/or audio chunks, and extract the NAL units or video samples from the received chunks. An exemplary network source will be described in relation to FIG. 11.

The video and audio decoders 1004 and 1006 are responsible for receiving compressed video or audio data (NAL units or audio samples) from the network source 1002 and converting the compressed media into uncompressed video or audio data.

The video and audio renderers 1008 and 1010 are responsible for receiving the uncompressed video and audio data from the video and audio decoders 1004 and 1006 respectively, and converting the uncompressed video and audio data to video and audio streams that can be displayed or played on the output device 118.

In some embodiments, the video and audio decoders 1004 and 1006 and the video and audio renderers 1008 and 1010 are implemented using a standard media player such as Windows Media Player or Flash Player.

Figure 11:
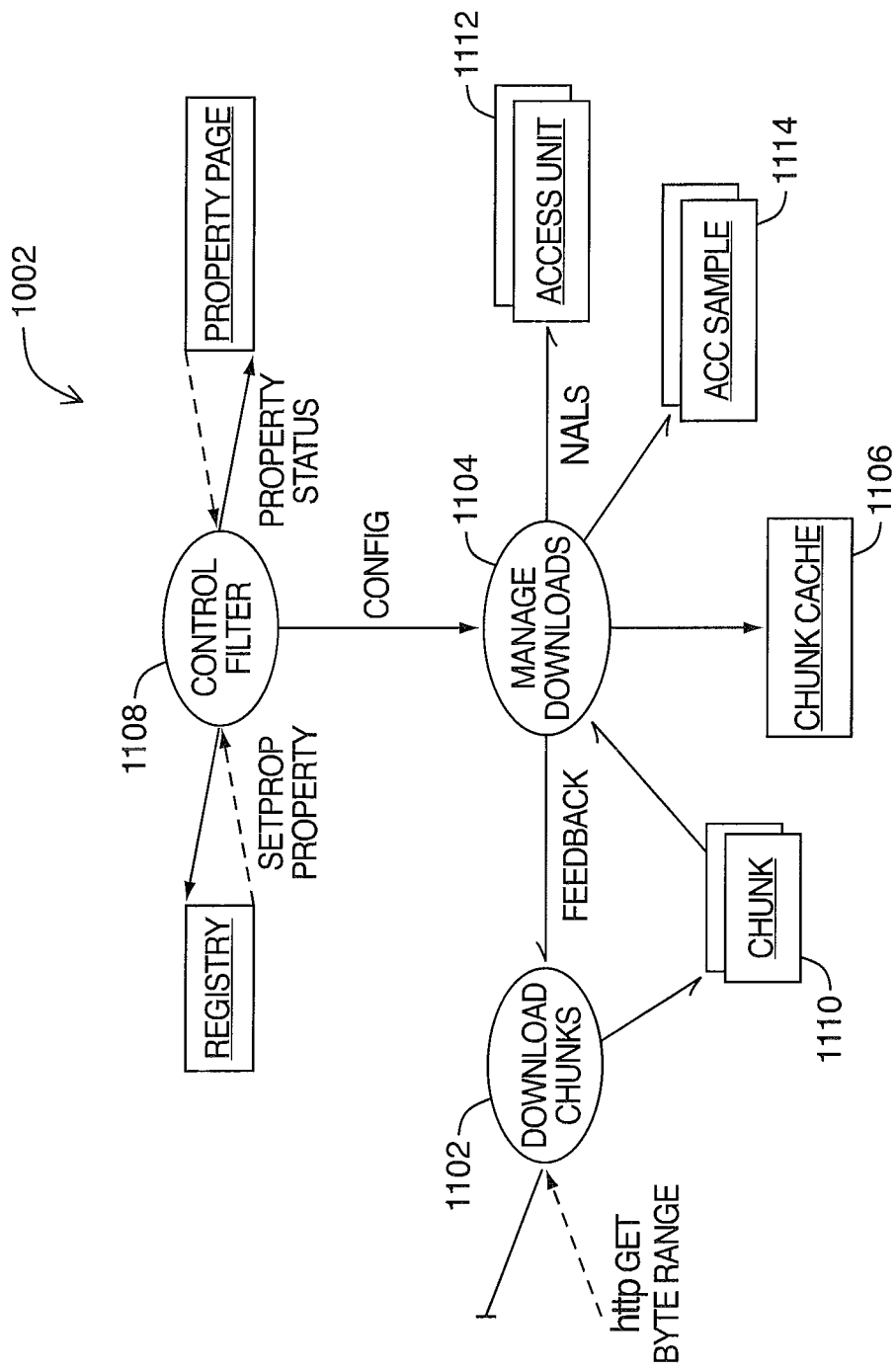
FIG. 11 is a block diagram of the network source of FIG. 10 in accordance with at least one embodiment.

Reference is now made to FIG. 11, which illustrates the network source 1002 of FIG. 10 in accordance with an embodiment. The network source 1002 comprises a download module 1102, a download manager module 1104, a chunk cache 1106, and a control filter module 1108. The download module 1102, the download manager module 1104, the chunk cache 1106, and the control filter module 1108 work together to obtain the retrieval information, determine which chunks to retrieve, and extract and organize the NAL units and audio samples from the received chunks into a suitable format for processing by the video and audio decoders 1004 and 1006.

The download module 1102 is responsible for downloading the retrieval information 218 and the desired video and/or chunks from the server 104. The download process is typically initiated by a user clicking on a link to a scalable media presentation they wish to view and/or listen to. The link information is typically passed to the download module 1102 and in response the download module 1102 generates and sends a request to the server 104 for the selected scalable media presentation.

The link typically includes a URL (uniform resource locator) address that represents the retrieval information 218. As described above, the retrieval information may be stored in the same scalable media file or files as the video and audio chunks, or it may be stored in a separate scalable media file from the video and audio chunks. In some embodiments, the request is a HTTP request.

In response to the request, the server 104 will typically return at least a portion of the retrieval information 218 to the download module 1102. As described above, the retrieval information 218 comprises information for retrieving the video and/or audio chunks of the scalable media presentation. Typically the retrieval information 218 provides a list of byte ranges for each time period of the scalable media presentation, where each byte range corresponds to a video or audio chunk. In some embodiments, the server 104 will return all of the retrieval information 218 to the download module 1102, and in other embodiments, the server 104 will return only a portion of the retrieval information 218 to the download module 1102. For example, where there is a large amount of retrieval information 218 (e.g. when the scalable media presentation is long in duration) it may be beneficial to provide the download module 1102 with only a portion of the retrieval information 218 initially and then supply the remainder of the retrieval information 218 over time through, for example, pipeline requests. This would allow quicker retrieval of the initial retrieval information.

Once the download module 1102 receives the retrieval information 218, the download module 1002 forwards the retrieval information 218 to the download manager module 1104. The download manager module 1104 then uses the retrieval information to determine which video and/or audio chunks to download. Once the download manager module 1104 determines which video and/or audio chunks to retrieve it provides this information to the download module 1102.

Upon receiving the time period and the layer or layers to retrieve from the download manager module 1104, the download module 1102 parses the retrieval information 218 to get the location information (i.e. byte ranges) for the desired video and/or audio chunks. The download module 1102 then uses the location information to generate and send a request to the server 104 for the desired video and/or audio chunks.

Where, for example, the retrieval information 218 comprises one or more byte range boxes and one byte range index box as described in reference to FIGS. 6 and 7, the download module 1102 uses the byte range index box to determine which byte ranges listed in the desired byte range box or byte range boxes correspond to the desired layers. The download module 1102 then generates one or more HTTP byte-range requests for the desired byte range or ranges.

In some embodiments, where more than one video and/or audio chunk is desired, the download module 1102 may generate a single HTTP byte-range request for each chunk. In other embodiments, the download module 1002 may generate a single HTTP byte-range request for multiple chunks when the chunks are contiguous. In other embodiments, the download module 1102 may generate a single HTTP request containing multiple byte ranges. In still further embodiments, the download module 1102 may use combinations of the above.

In response to the request, the download module 1102 will receive the requested video and/or audio chunks 1110 from the server 104. The download module 1102 then forwards the received video and/or audio chunks 1110 to the download manager module 1104.

The download manager module 1104 is responsible for (i) determining which video and/or audio chunks to retrieve; and (ii) extracting and ordering the data units (NAL units or audio samples) from the received video and/or audio chunks.

Upon receiving the retrieval information 218 from the download module 1102, the download manager module 1104 determines which video and/or audio chunks to retrieve. Typically the first step in determining which video and/or audio chunks to retrieve involves determining which time period or time periods of the scalable media presentation to retrieve. In some embodiments, this involves determining the scalable media presentation type (i.e. live, broadcast or on-demand). The scalable media presentation type may be provided, for example, in the retrieval information 218 in the authorization box. Specifically, as described above, the authorization box may include a play type field, which specifies the type of the scalable media presentation.

If the scalable media presentation is of a live or broadcast type then the time period to retrieve may be specified in the retrieval information 218. For example, as described above, the retrieval information 218 may include a time box that specifies the current time period. As described above, the current time period is used to ensure that all of the clients viewing or listening to the scalable media presentation are viewing or listening to the same part of the scalable media presentation at roughly the same time. If, however, the scalable media presentation is of the on-demand type then typically the media client wants to start at the beginning and thus will want to retrieve the first time period of the scalable media presentation.

Once the download manager module 1104 determines which time period or time periods of the scalable media presentation to retrieve, the download manager module 1104 determines which layer or layers of the scalable media presentation to retrieve. In some embodiments, the download manager module 1104 will use one or more of the following to select the layer or layers to retrieve: client specific information, network authorization information, bandwidth between the client device 106 and the server 104, and the total duration of the scalable media presentation. In other embodiments, the download manager module 1104 may use other suitable parameters.

Client specific information typically includes information about the capabilities of the client device 106. For example, if the client device 106 is a mobile phone with a very small display screen, it is likely not worth it to download the highest quality video since the display screen is not capable of displaying such high quality video. Client specific information may also include user-adjustable parameters. For example, a user may have the option of setting the maximum video and/or audio quality to ensure that the bandwidth associated with the audio or video stays below a certain amount. Alternatively, the user may have the option of setting the maximum bandwidth directly.

As described above, the retrieval information may include authorization information that indicates the maximum video and/or audio quality that the client is authorized to access. For example, the client devices may be limited to a specific video and/or audio quality unless they pay an additional fee.

In some embodiments, the download manager module 1104 estimates the network bandwidth between the client device 106 and the server 104 based on the time it took to download the retrieval information 218. Such a calculation will typically only produce an accurate estimate when the retrieval information 218 is of a substantial size. For example, where the requested scalable media presentation is short in duration or where only a portion of the retrieval information 218 is initially provided to the client device 106, an accurate estimate of the bandwidth cannot be determined through this method. In these cases, the media client 116 may start by downloading the lowest quality (or lowest bandwidth) video and audio chunks and then use this information to accurately estimate the bandwidth. For example, the download manager module 1104 can accurately calculate the size of any combination of audio and video chunks based on the byte range information provided in the retrieval information 218.

In one embodiment, the download manager module 1104 estimates the bandwidth between the client device 106 and the server 104 based on its last chunk retrieval (i.e. size of last set of chunks/time to receive last set of chunks). The download manager module 1104 then determines the size of the next chunk(s) based on the retrieval information 218. The download manager module 1104 can then use this information to estimate the time it will take to download the next chunk(s). The download manager module 1104 then selects the highest layer that it estimates can be delivered within one time period. For example, if each chunk represents 5 seconds of video or audio, then the download manager module 1104 may select the highest layer of video and/or audio that can be delivered within 5 seconds. The download manager module 1104 may then re-estimate the bandwidth after the next chunk(s) is received.

The download manager module 1104 may also use the total size of the scalable media presentation to determine the layers to download. For example, if the total duration of the scalable media presentation is short (e.g. less than 1 minute), and the client device 106 has a high-speed connection to the server 104, then it may make sense to download the entire scalable media presentation at the highest quality and if required, slightly delay the start of the playback.

Once the download manager module 1104 selects the time period and the layer or layers to retrieve, the download manager module 1104 forwards this information to the download module 1102. As described above, the download module 1102 will use the time period and layer or layer information to generate a request for the corresponding video and/or audio chunks. In response to the request, the download module 1102 will receive the desired video and/or audio chunks 1110 and forward them to the download manager module 1104.

Upon receiving the downloaded video and/or audio chunks 1110 from the download module 1102, the download manager module 1104 will typically complete the following: (i) make a copy of the downloaded video and/or audio chunks 1110 and place them in the chunk cache 1106; (ii) extract the data units (NAL units or audio samples) from the downloaded video and/or audio chunks; and (iii) organize the extracted data units (NAL units and/or audio samples) into the appropriate order for feeding to the decoders.

As described above, the first step upon receiving the downloaded video and/or audio chunks 1110 may be to make copies of the downloaded video and/or audio chunks 1110 and place the copies in the chunk cache 1106.

The second step may be to extract the individual data units (NAL units or audio samples) from the downloaded video and/or audio chunks 1110. As described above in reference to FIG. 8, each video and/or audio chunk typically includes indexing information and data units (NAL units or audio samples). The indexing information provides information that can be used by the download manager module 1104 to extract the individual data units (NAL units or audio samples) from the chunk. For example, the indexing information may comprise offset and length fields for each data unit (NAL unit or audio sample of the chunk). The offset specifies the byte offset for the start of the data unit (NAL unit or audio sample) within the chunk, and the length field specifies the length (typically in bytes) of the data unit (NAL unit or audio sample).

The third step may be to organize the extracted data units (NAL units and audio samples) into a video stream 1112 of NAL units, and/or an audio stream 1114 of audio samples. Typically the indexing information provides information for placing the data units (NAL units and audio samples) into the correct order. For example, the indexing information may comprise a decoding order number for each data unit (NAL unit or audio sample) that can be used by the download manager module 1104 to order the data units (NAL units or audio samples). The resultant video and/or audio streams 1112 and 1114 are then fed to the corresponding decoder 1004 or 1006.

The chunk cache 1106 is responsible for storing at least a portion of the video and/or audio chunks that have been downloaded. The chunk cache 1006 may be used to improve the latency of backward seeking by maintaining at least a portion of the video and/or audio chunks that have been downloaded or retrieved. In some embodiments, the chunk cache 1106 may be a first-in-first-out (FIFO) buffer that stores the most recently downloaded video and/or audio chunks. There may be separate chunk caches for video and audio chunks or a single chunk cache for both audio and video chunks.

The control filter module 1108 is a development tool that can be used to build a user interface that enables a user to enter user parameters. For example, the user interface may allow the user or operator to specify the layer they wish to receive. The user's selection may then be provided to the download manager module 1104 via a communications link between the control filter module 1108 and the download manager module 1104. In some embodiments the control filter module 1108 is a DirectShow™ provided filter.

Figure 12:
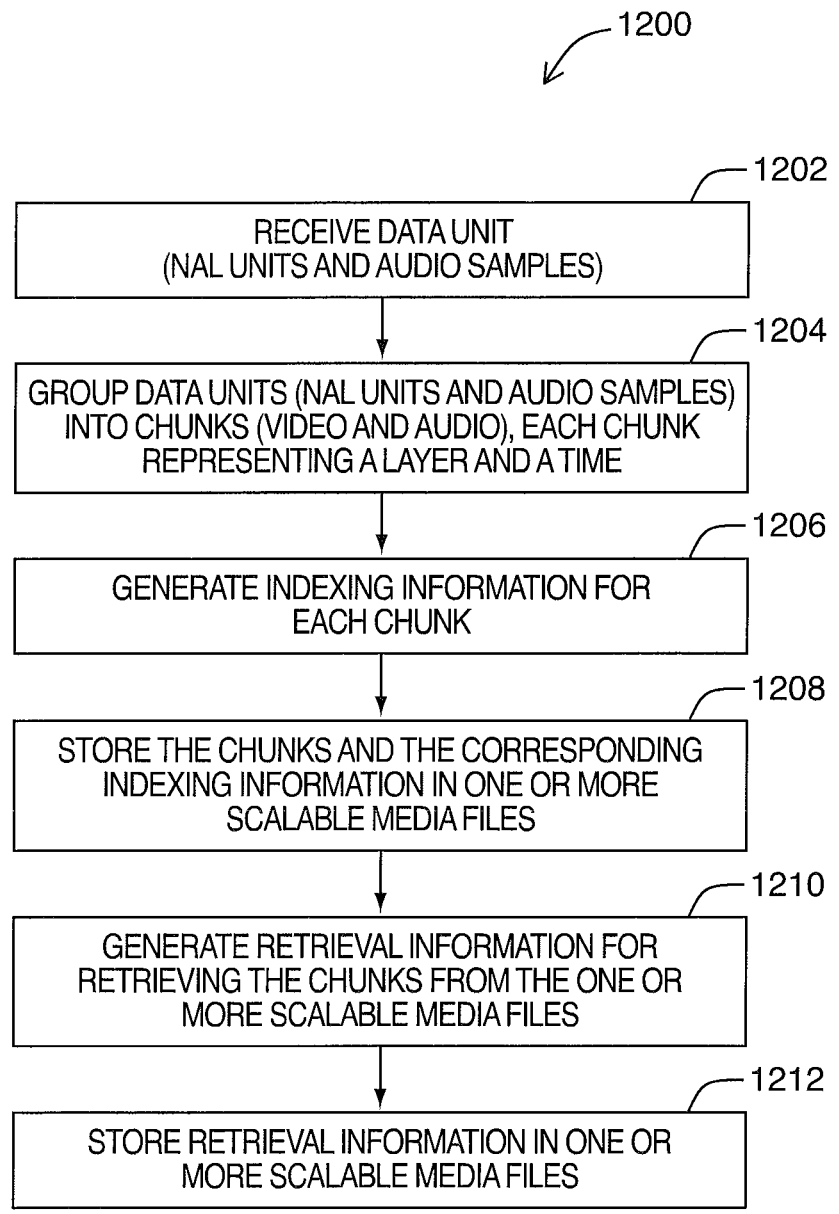
FIG. 12 is a flowchart of a method for creating one or more scalable media files in accordance with at least one embodiment.

Reference is now made to FIG. 12, which illustrates a method 1200 for creating one or more scalable media files in accordance with an embodiment. Method 1200 may be implemented by a file creation module, such as file creation module 102.

At (1202), the file creation module 102 receives a plurality of data units representing a scalable media presentation. In one embodiment, the scalable media presentation is an SVC-encoded video and the received data units are NAL units wherein each NAL unit is associated with a layer (or DTQ value). In some embodiments, the file creation module 102 also receives a plurality of audio samples corresponding to one or more audio tracks for the SVC-encoded video. Each audio track typically corresponds to a different quality of audio.

At (1204), the file creation module 102 groups the plurality of data units (i.e. NAL units and audio samples) into a plurality of chunks. In a preferred embodiment, the NAL units are grouped into a plurality of video chunks where each video chunk represents only those NAL units of a specific layer (DTQ value) of a specific time period. The audio samples may be grouped into a plurality of audio chunks where each audio chunk represents only those audio samples of a specific time period.

At (1206), the file creation module 102 generates indexing information for each chunk (video chunk and audio chunk). The indexing information provides information for extracting each of the plurality of data units (NAL units or audio samples) from the corresponding video or audio chunk. The indexing information may comprise one or more of the following for each NAL or audio sample in the video or audio chunk: a decoding order number specifying the order in which to decode the associated NAL unit or audio sample; an offset specifying the location (e.g. byte offset) of the start of the NAL unit or audio sample in the video or audio chunk; and length information specifying the length (e.g. number of bytes) of the NAL unit or audio sample. Exemplary indexing information was described in detail in reference to FIG. 3.

At (1208), the file creation module 102 stores the chunks (video and audio chunks) and the corresponding indexing information in one or more scalable media files. In one embodiment each video and audio chunk (including the associated indexing information) is stored in a separate scalable media file. In other embodiments, the video and audio chunks (including the associated indexing information) are grouped into fragments, where a fragment comprises all of the video and audio chunks corresponding to a specific time period of the scalable media presentation. Each fragment may then be stored in a separate scalable media file.

In still a further embodiment, all of the video and audio chunks (including the associated indexing information) are grouped into fragments and all of the fragments are stored in a single scalable media file. In one embodiment, the plurality of fragments are organized in temporal order. For example, the fragment for time zero (T0) appears in the scalable media file before the fragment for time one (T1).

Each fragment comprises a plurality of chunks. In some cases, the video and/or audio chunks within a fragment are organized in numerical order (e.g. the video chunk corresponding to layer 0 (L0) is placed in the scalable media file before the video chunk corresponding to layer 1 (L1)). In other cases, the video and/or audio chunks may be arranged within each fragment based on the inter-dependencies of the layers to minimize the number of byte range requests a client device would have to make to obtain the video chunks. As described above there are inter-dependencies between video layers that are not always contiguous. These inter-dependencies can be used to organize the video chunks to minimize the number of byte range requests to obtain some of the higher layers. For example, if layer 7 is dependent on layer 4, 2 and 0, it may be beneficial to place the video chunks corresponding to layers 7, 4, 2 and 0 contiguously in the scalable media file so that when a media client wants to retrieve layer 7, it can retrieve layers 7, 4, 2 and 0 in one single byte range request.

Each chunk (video or audio) typically comprises two components: the indexing information and the data units (NAL units or audio samples). Typically the indexing information is placed in the scalable media file before the corresponding data units.

At (1210), the file creation module 102 generates retrieval information. The retrieval information provides information to a client device for retrieving the chunks (video and/or audio) from the one or more scalable media files. The retrieval information allows a client device to retrieve only the chunks (video and/or audio) it wants. In some embodiments, the retrieval information provides a byte range for each chunk (video and/or audio) of the scalable media presentation so that the client device can retrieve the chunks it wants via HTTP byte-range requests.

In one embodiment, the retrieval information comprises multiple byte range boxes and one byte range index box. In this embodiment, there is typically one byte range box for each non-overlapping time period of the scalable media presentation. Each byte range box lists the byte ranges of the video and/or audio chunks for that time period. Each byte range box may also include other information that the media client (e.g. media client 116) may use in the retrieval process. For example, the byte range boxes may also include the first frame number of the chunks, the maximum number of frames in any chunk, the number of audio tracks available, and the start and end sample number for each available audio track. An exemplary byte range box was described in reference to FIG. 6.

The byte range index box links or maps the order of the byte ranges of the byte range boxes to a type of media (audio, video etc.) and to a video layer or an audio track number. For example, the byte range index box may indicate the following: (i) the first byte range in any byte range box corresponds to a video chunk containing NAL units of Layer 0; (ii) the second byte range in any byte range box corresponds to a video chunk containing NAL units of Layer 1; and (iii) the third byte range in any byte range box corresponds to an audio chunk containing audio samples of a first audio track. An exemplary byte range index box was described in reference to FIG. 7.

In some embodiments, the retrieval information may also include one or more of the following boxes: a file name box, an authorization box, and a time box. Each of these optional boxes was described above in reference to FIG. 2.

At (1212), the file creation module 102 stores the retrieval information in one or more scalable media files. In some embodiments, the retrieval information or at least a portion of the retrieval information is stored in the same scalable media file(s) as the video and/or audio chunks. In other embodiments, the retrieval information is stored in a separate scalable media file or files from the video and/or audio chunks.

In one embodiment, each video chunk associated with the base layer (e.g. layer 0 (L0)) will further comprise the byte range box for at least one subsequent time period. The byte range box for the at least one subsequent time period is typically included in the video chunk associated with the base layer because all higher video layers are dependent on the base layer. Accordingly, a client device 106 will always have to retrieve the video chunk associated with the base layer to be able to view the video. This means that the client device 106 will only have to make a single request to get both the base layer video chunk and the subsequent time period retrieval information. Accordingly, after the client device 106 downloads the retrieval information a first time, it can rely on the retrieval information in the base layer video chunk to retrieve the video and/or audio chunks of the subsequent time period. An exemplary scalable media file in accordance with this embodiment was described in reference to FIG. 9.

Figure 13:
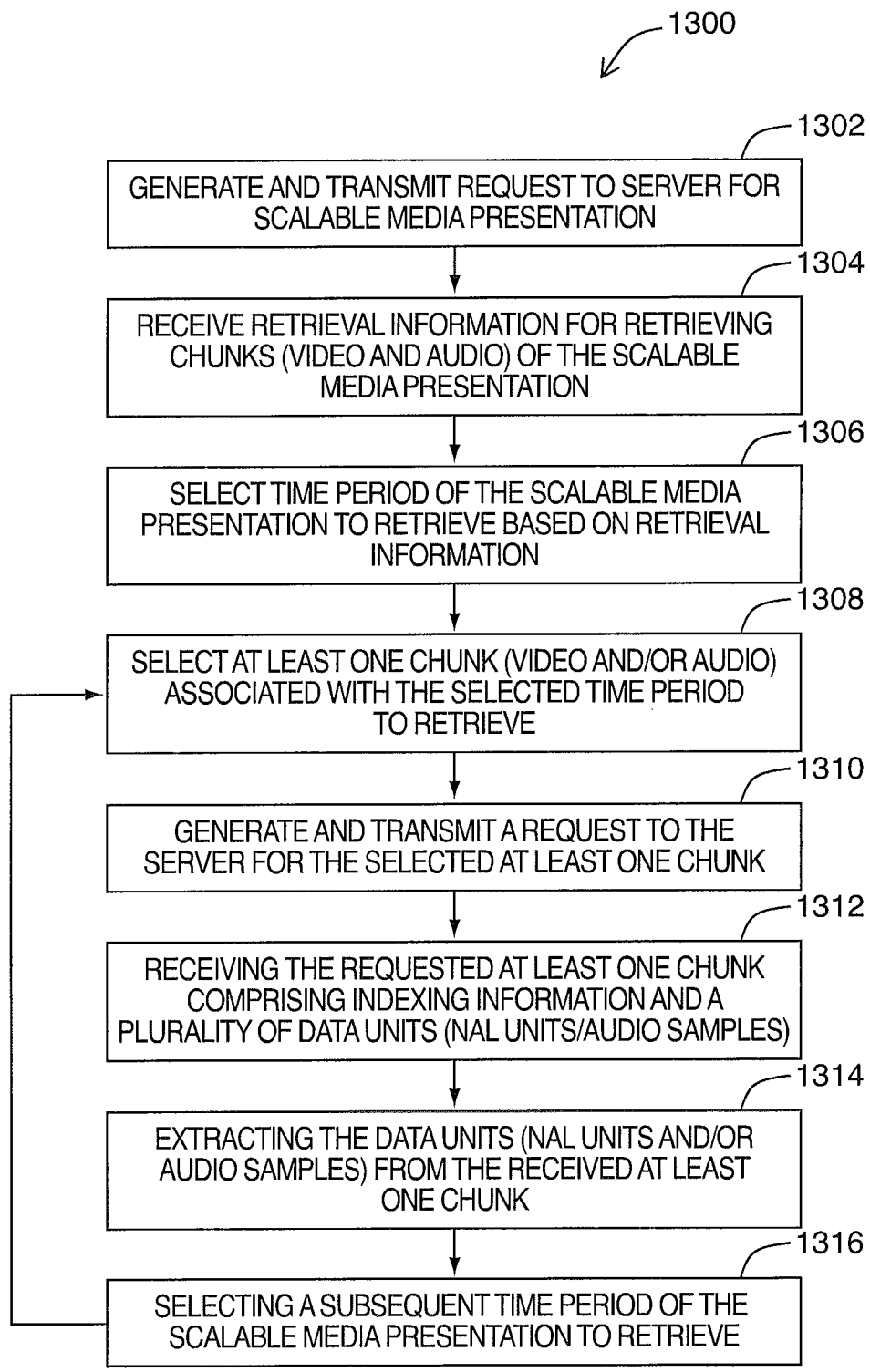
FIG. 13 is a flowchart of a method for retrieving a scalable media presentation in accordance with at least one embodiment.

Reference is now made to FIG. 13, which illustrates a method 1300 for receiving a scalable media presentation over a communications network in accordance with an embodiment. Method 1300 may be implemented by a media client, such as media client 116.

At (1302), the media client 116 generates and transmits a request to a server 104 for a scalable media presentation. In one embodiment, the request is a HTTP request.

At (1304), in response to the request sent in (1302) the media client 116 receives retrieval information from the server 104 for the scalable media presentation. The retrieval information provides information to a client device for retrieving the chunks (video and/or audio) from the one or more scalable media files. The retrieval information allows a client device to retrieve only the chunks (video and/or audio) it wants. In some embodiments, the retrieval information provides a byte range for each chunk (video and/or audio) of the scalable media presentation so that the client device can retrieve the chunks it wants via HTTP byte-range requests.

In one embodiment, the retrieval information comprises multiple byte range boxes and one byte range index box. In this embodiment, there is typically one byte range box for each non-overlapping time period of the scalable media presentation. Each byte range box lists the byte ranges of the video and/or audio chunks for that time period. Each byte range box may also include other information that the media client (e.g. media client 116) may use in the retrieval process. For example, the byte range boxes may also include the first frame number of the chunks, the maximum number of frames in any chunk, the number of audio tracks available, and the start and end sample number for each available audio track. An exemplary byte range box was described in reference to FIG. 6.

The byte range index box links or maps the order of the byte ranges of the byte range boxes to a type of media (audio, video etc.) and to a video layer or an audio track number. For example, the byte range index box may indicate the following: (i) the first byte range in any byte range box corresponds to a video chunk containing NAL units of Layer 0 (L0); (ii) the second byte range in any byte range box corresponds to a video chunk containing NAL units of Layer 1 (L1); and (iii) the third byte range in any byte range box corresponds to an audio chunk containing audio samples of a first audio track. An exemplary byte range index box was described in reference to FIG. 7.

In some embodiments, the retrieval information may also include one or more of the following boxes: a file name box, an authorization box, and a time box. Each of these optional boxes was described above in reference to FIG. 2.

At (1306), the media client 116 selects the time period of the scalable media presentation to retrieve. Selecting the time period of the scalable media presentation to retrieve may include determining the type of the scalable media presentation from the retrieval information.

At (1308), the media client 116 selects at least one chunk (video and/or audio) associated with the selected time period to retrieve. As described above, the media client 116 may use one or more of the following to select the layer or layers (i.e. chunks) to retrieve: client specific information, network authorization information, bandwidth between the client device and the server, and the total duration of the scalable media presentation. In other embodiments, the download manager module 1104 may use other suitable parameters. Exemplary methods for selecting that chunks to retrieve were described in reference to FIG. 11.

At (1310), the media client 116 generates and transmits a request to the server 104 for the at least one chunk (video and/or audio) using the retrieval information (e.g. the byte range of the desired chunks). In some embodiments, the request is a HTTP byte-range request.

At (1312), in response to the request made at (1310) the media client 116 receives the at least one requested chunk (video or audio) from the server 104. The requested chunk comprises indexing information and data units (NAL units or audio samples). The indexing information provides information for extracting each of the plurality of data units (NAL units or audio samples) from the corresponding video or audio chunk. The indexing information may comprise one or more of the following for each NAL or audio sample in the video or audio chunk: a decoding order number specifying the order in which to decode the associated NAL unit or audio sample; an offset specifying the location (e.g. byte offset) of the start of the NAL unit or audio sample in the video or audio chunk; and length information specifying the length (e.g. number of bytes) of the NAL unit or audio sample. Exemplary indexing information was described in detail in reference to FIG. 3.

At (1314), the media client 116 extracts the data units (NAL units or audio samples) from the received at least one chunk (video or audio) using the associated indexing information and feeds them to a decoder. For example, the media client 116 may use the offset and length information for each data unit (NAL unit or audio sample) to retrieve the data units from the chunk. In some embodiments the media client 116 may also arrange the extracted data units (NAL units and/or audio samples) according to the DONs in the indexing information prior to sending the extracted data units to the decoder.

At (1316), the media client 116 selects a subsequent time period of the scalable media presentation to retrieve. Typically the subsequent time period is the time period that immediately followed the previously selected time period. Steps (1308) to (1316) are then repeated until there are no more time periods to retrieve or until the user at the media client 116 no longer wishes to view or listen to the scalable media presentation.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for receiving a scalable media presentation over a communications network, the method comprising:
   (a) transmitting a request from a client device to a server for a scalable media presentation;
   (b) receiving retrieval information from the server in response to the request for the scalable media presentation, the retrieval information providing information for retrieving a plurality of video chunks associated with the scalable media presentation, each video chunk comprising network abstraction layer (NAL) units associated with only one layer of a plurality of layers for a specific time period of the scalable media presentation;
   (c) selecting a time period of the scalable media presentation to retrieve;
   (d) selecting at least one video chunk associated with the selected time period based on the retrieval information;
   (e) transmitting a request to the server for the at least one video chunk; and
   (f) receiving the at least one video chunk and indexing information associated with the at least one video chunk from the server, the indexing information providing information for extracting the plurality of NAL units from the at least one video chunk; and
   (g) extracting the NAL units from the at least one video chunk based on the indexing information associated with the at least one video chunk.

2. The method of claim 1, further comprising:
(h) selecting a subsequent time period of the scalable media presentation to retrieve; and
(i) repeating steps (d) to (h) until there are no more time periods of the scalable media presentation to retrieve.

3. The method of claim 1, wherein the indexing information comprises an offset and a length for each NAL unit in the associated video chunk, and step (g) comprises extracting each NAL unit from the at least one video chunk using the offset and length.

4. The method of claim 1, wherein the indexing information comprises a decoding order number for each NAL unit in the associated video chunk; and the method further comprises ordering the extracted NAL units based on the decoding order numbers.

5. The method of claim 1, wherein the retrieval information links each video chunk to a specific byte range of an associated scalable media file; and the request for the at least one video chunk is a byte range request based on the retrieval information.

6. The method of claim 5, wherein:
(A) the retrieval information comprises a byte range index and at least one byte range box;
(B) the at least one byte range box specifies a plurality of byte ranges associated with a specific time period, each byte range being associated with one video chunk; and
(C) the byte range index links each of the plurality of byte ranges with one layer of the plurality of layers.

7. The method of claim 1, wherein:
(A) the at least one video chunk comprises mapping information for retrieving the video chunks of a subsequent time period; and
(B) the method further comprises selecting at least one second video chunk to retrieve based on the mapping information of the at least one video chunk received.

8. The method of claim 1, wherein the retrieval information further provides information for retrieving a plurality of audio chunks, each audio chunk comprising audio samples for a specific time period of the scalable media presentation; and the method further comprises:
(h) selecting at least one audio chunk associated with the selected time period based on the retrieval information;
(i) transmitting a request to the server for the selected at least one audio chunk;
(j) receiving the at least one audio chunk and indexing information associated with the at least one audio chunk; and
(k) extracting the audio samples from the at least one audio chunk based on the indexing information associated with the at least one audio chunk.

9. The method of claim 1, wherein the server is a web server and the request for the at least one video chunk is a HTTP byte range request.

* * * * *